(12) United States Patent
Ohara et al.

(10) Patent No.: US 7,418,533 B2
(45) Date of Patent: Aug. 26, 2008

(54) DATA STORAGE SYSTEM AND CONTROL APPARATUS WITH A SWITCH UNIT CONNECTED TO A PLURALITY OF FIRST CHANNEL ADAPTER AND MODULES WHEREIN MIRRORING IS PERFORMED

(75) Inventors: Shigeyoshi Ohara, Kawasaki (JP); Kazunori Masuyama, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 84 days.

(21) Appl. No.: 11/378,379

(22) Filed: Mar. 20, 2006

(65) Prior Publication Data
US 2007/0162561 A1 Jul. 12, 2007

(30) Foreign Application Priority Data
Nov. 28, 2005 (JP) ............................. 2005-342081

(51) Int. Cl.
*G06F 15/16* (2006.01)
(52) U.S. Cl. ............................. 710/62; 710/33; 710/38; 710/72; 710/74; 710/131; 711/112; 711/113; 711/114; 711/143; 714/4; 714/5; 714/6
(58) Field of Classification Search .................. 710/33, 710/38, 62, 72, 74, 131; 711/112–114, 143; 714/4–6
See application file for complete search history.

(56) References Cited

U.S. PATENT DOCUMENTS

| 6,915,380 | B2* | 7/2005 | Tanaka et al. ................ 711/114 |
| 7,139,934 | B2* | 11/2006 | Nakagawa et al. ............. 714/6 |
| 2006/0123200 | A1* | 6/2006 | Ito et al. ...................... 711/143 |

FOREIGN PATENT DOCUMENTS

| JP | 10-91363 | 4/1998 |
| JP | 11-203201 | 7/1999 |
| JP | 2001-256003 | 9/2001 |
| JP | 2003-303055 | 10/2003 |

* cited by examiner

*Primary Examiner*—Tammara R Peyton
(74) *Attorney, Agent, or Firm*—Staas & Halsey LLP

(57) ABSTRACT

A storage system has a plurality of control modules for controlling a storage device for accesses from a mainframe host and an open system host respectively supporting different protocols. An open channel adaptor and a mainframe channel adaptor are separately provided. The mainframe channel adaptor is connected to a plurality of control managers via front routers and performs parallel write access from the mainframe host for mirroring. In the write processing for the mainframe host, the connection is maintained until the completion of processing. In particular, even in case of a write miss, disk read processing can be performed in parallel, thus contributing to the high-speed processing in case of the write miss. Further, for an access from the open system host, a high throughput can be obtained.

18 Claims, 13 Drawing Sheets

FIG. 5

DATA STORAGE SYSTEM AND CONTROL APPARATUS WITH A SWITCH UNIT CONNECTED TO A PLURALITY OF FIRST CHANNEL ADAPTER AND MODULES WHEREIN MIRRORING IS PERFORMED

CROSS-REFERENCE TO RELATED APPLICATIONS

This application is based upon and claims the benefit of priority from the prior Japanese Patent Application No. 2005-342081, filed on Nov. 28, 2005, the entire contents of which are incorporated herein by reference.

BACKGROUND OF THE INVENTION

1. Field of the Invention

The present invention relates to the configurations of a data storage system for use as an external storage device of a computer, and a data storage control apparatus, and more particularly, a data storage system having the combinations and connections of units so as to configure the data storage system connecting a multiplicity of disk devices with high performance and flexibility, and a data storage control apparatus.

2. Description of the Related Art

In recent years, as a variety of data has been structured of electronic form and handled by computers, the importance of a data storage apparatus (external storage apparatus) capable of storing a large amount of data with good efficiency and high reliability, independently of a host computer for processing the data, is increasing.

As such a data storage apparatus, a disk array apparatus constituted of a large quantity of disk devices (for example, magnetic disk drives and optical disk drives) and a disk controller for controlling the above large quantity of disk devices has been put into use. The disk array apparatus can control such the large quantity of disk devices by accepting disk access requests simultaneously from a plurality of host computers. In recent years, there has been provided a disk array apparatus capable of controlling disk devices of a few thousands or more in number, or in terms of storage capacity, a disk device group of a few hundred terabytes or more, by use of a single disk array apparatus.

Such a disk array apparatus incorporates a memory that plays the role of a disk cache. With this, it becomes possible to reduce a data access time required when a read request or a write request is received from a host computer, making it possible to obtain high performance.

In general, the disk array apparatus is constituted of a plurality of kinds of major units, namely, channel adaptors provided in the connection portion to the host computer, disk adaptors provided in the connection portion to disk drives, control units taking charge of controlling the cache memory and the disk array apparatus as a whole, and a large quantity of disk drives.

FIG. 15 shows a configuration diagram of a disk array apparatus 100 according to a first conventional example. As shown in FIG. 15, the conventional disk array apparatus 100 is structured of a plurality of major units, including control managers (shown as CM in the figure) 10 each having a cache memory and a cache control unit, channel adaptors (shown as CA in the figure) 11 for interfacing with host computers (not shown in the figure), disk enclosures 12 each having a plurality of disk drives, and disk adaptors (shown as DA in the figure) 13 for interfacing with the above disk enclosures 12.

Furthermore, there are provided routers (shown as RT in the figure) 14 for interconnecting among the control managers 10, the channel adaptors 11, and the disk adaptors 13 to perform data transfer and communication among such the major units.

There are provided four control managers 10 in the above disk array apparatus 100. Also, the four routers 14 are provided corresponding to the control managers 10. The above control managers 10 and routers 14 are interconnected in one-to-one correspondence. By this, the connections between the plurality of control managers 10 become redundant, so as to increase availability (for example, the Japanese Unexamined Patent Publication No. 2001-256003).

Namely, in the event that one of the routers 14 becomes faulty, the connections among the plurality of control managers 10 can be secured by passing data through another router 14. Thus, the disk array apparatus 100 can continue normal operation even in such a case.

Further, in the above disk array apparatus 100, two channel adaptors 11 and two disk adaptors 13 are connected to each router 14. The channel adaptors 11 and disk adaptors 13 can communicate with any control managers 10 through the interconnections between the control managers 10 and routers 14.

Also, the channel adaptors 11 are connected to host computers (not shown) processing data, through, for example, Fibre Channel and Ethernet (registered trademark). Meanwhile, the disk adaptors 13 are connected to the disk enclosures 12 (typically, a group of the disk drives) through, for example, a Fiber Channel cable.

Further, exchanges of a variety of types of information (for example, data mirroring processing among a plurality of cache memories), which maintains the consistency of the operation inside disk array apparatus 100 as well as user data from the host computers, are performed between the channel adaptors 11 and the control managers 10, as well as between the disk adaptors 13 and the control managers 10.

In the above disk array apparatus 100, a control manager taking charge of the cache function is assigned in advance on the basis of each address of each mounted disk. Therefore, on receipt of a disk access request from a host, first, it is necessary for the disk array apparatus 100 to perform operation for determining a control manager that takes charge of the requested address. Further, since the cache memory is structured of a volatile memory, it is necessary to perform mirroring, that is, storing the identical data into a cache memory of another control manager, to prepare for the occurrence of a fault.

Namely, in case of write operation from a host computer, data from the host computer are first received in the channel adaptor 11. The channel adaptor 11 inquires one control manager 10 which control manager 10 is taking charge of the disk requested from the host. Thereafter, the channel adaptor 11 writes the data into the cache memory provided in the control manager 10 in change. When the write operation is completed normally, the channel adaptor 11 sends a completion notification to the host computer.

Similarly, on receipt of a read request from a host computer, the channel adaptor 11 inquires one control manager 10 which control manager 10 is taking charge of the requested data. Thereafter, the channel adaptor 11 requests the control manager 10 in charge to send the read data.

The received control manager 10 immediately notifies the read data to the channel adapter 11, if the data of interest is existent in the cache memory. On the contrary, the data of interest is not existent in the cache memory, the control manager 10 requests the disk adaptor 13 to read out the data from the disk.

The disk adaptor 13 reads out the data from the disk, then the disk adaptor 13 writes the data into the cache memory of the control manager 10 in charge. In response to the above data write, the control manager 10 in charge notifies the channel adaptor 11 that it has become possible to read out the data. On receipt of the above notification, the channel adaptor 11 reads out the data from the cache memory, and then transfers the read data to the host computer.

FIG. 16 shows an explanation diagram of a second conventional technique. A disk array apparatus 102 shown. in FIG. 16 includes four (4) control managers (cache memories and control units) 10. Each control manager (CM) 10 is connected to the channel adaptor (CA) 11 and the disk adaptor (DA) 13.

Further, four control managers 10 are interconnected by a pair of routers 14 so as to enable communication among each other. The channel adaptor 11 is connected to a host computer(s) (not shown) through Fibre Channel or Ethernet (registered trademark). Also, the disk adaptor 13 is connected to the disk drives in the disk enclosure 12, through, for example, Fiber Channel cables.

Further, the disk enclosure 12 has two ports (for example, Fiber Channel ports) connected to the different disk adaptors 13. With this, redundancy is provided in the configuration, so as to increase fault tolerance.

Through the above routers 14, exchanges of a variety of types of information (for example, data mirroring processing among a plurality of cache memories) are performed so as to maintain the consistency of the operation inside disk array unit 102.

In the above second conventional example, the channel adaptor 11 receives the write data from the host computer, and transfers the write data to the control manager 10 under connection. On receipt of the write data, the control manager 10 confirms a control manager 10 in charge, and if the data-received control manager is taking charge, the control manager 10 of interest notifies the channel adaptor 11 that data write processing has been completed. Meanwhile, if another control manager 10 is taking charge of the relevant data, the data is transferred to the other control manager 10 in charge, and the completion of data processing is notified to the channel adaptor 11. On receipt of the notification from the control manager 10 in charge, the channel adaptor 11 sends a write completion notification to the host.

In case of receiving a read request from the host computer also, first, the channel adaptor 11 issues a request to the control manager 10 under connection. On receipt of the above request, the control manager 10 confirms the control manager in charge. If the request-received control manager is taking charge, the control manager 10 of interest either extracts the data from the cache memory, or reads out the data from a disk via the disk adaptor 13, and then transfers the readout data to the channel adaptor 11.

On the other hand, in case another control manager 10 is taking charge, a request is sent to the relevant control manager 10 in charge. The control manager 10 in charge then transfers to the channel adaptor 11 the returned data through the read operation similar to the above description. The channel adaptor 11 then transfers the data received from the control manager 10 to the host computer.

Through spread of electronic data having been promoted in recent years, there are demands on a data storage system of larger capacity and higher speed. In each of the storage units shown in the above-mentioned two conventional examples, high availability and flexibility have been attained. However, in some aspects, it is insufficient to support a plurality of host interface types.

Namely, the support types are different depending on the difference in protocols and throughputs of the host interface. For example, for Fibre Channel and iSCSI (Internet Small Computer System Interface), which are interfaces for so-called open system host computers like a UNIX (registered trademark) server or an IA (Internet Appliance) server, a high throughput of 200 MB/s or more is required. In contrast, in FICON (registered trademark) and ESCON (registered trademark), which are the interfaces for mainframe host computers, it is sufficient if the throughput of 20 MB/s to 200 MB/s or of that order is provided.

Also, there is a difference in the response time expected by the hosts. In case of the open system host, after a request is transmitted, the connection to a storage device is once disconnected, and in the meantime, other processing is performed. On the other hand, in case of the mainframe host, a series of processing from first request transmission, data transfer to status reception is performed in most cases, through which the connection to a storage device is maintained. Accordingly, the mainframe host requires a short response time for one data transfer.

In case that such a plurality of host interfaces having different types of protocols or throughputs are to be supported, according to the configuration using the first conventional technique, a bottleneck of throughput is apt to be produced in the router, because the whole paths between the channel adaptors to the control managers, between the disk adaptors and the control managers, and among the respective control managers pass through the router. In short, it can be said that, by such a configuration, it is hard to provide the channel adaptor with a sufficient throughput.

Further, according to the configuration using the second conventional technique, a throughput problem does not occur because buses connecting between the channel adaptors and the control managers, between the disk adaptors and the control managers, and among the respective control managers are entirely independent. However, there are some cases that are hard to satisfy a required response speed for the host.

The above situation will be described below, taking an exemplary case of producing a substantially slow response speed. Consider a case of rewriting a portion of data on the disk by a data from a host. Since the disk data are protected by check codes given on the basis of a certain unit of data, when a portion of the data is to be rewritten, it is necessary to generate the check code a fresh, using the remaining portion of the unit of data, as well as the exact portion to be rewritten. If the remaining data does not exist in the cache, readout operation from the disk becomes necessary in spite of write processing, which takes a substantially long time to respond.

In particular, according to the second conventional technique, there are cases that the control manager taking charge of data requested from a host is not connected to the channel adaptor having received the request from the host. In such cases, the response time becomes still longer. In the following description, for the sake of explanation, a control manager to which a channel adaptor having received a request from a host is connected is referred to as CM-R (receive-CM), a control manager taking charge of the data concerned is referred to as CM-M (master-CM), and a control manager having mirror data of the cache data is referred to as CM-S (slave-CM).

(1) The channel adaptor 11 receives a write data from a host.

(2) In order to generate a check code, the disk adaptor 13 reads out the remaining data from the disk.

(3) The disk adaptor 13 writes the data into the control manager CM-M.

(4) The control manager CM-M transfers the data to the control manager CM-R.

(5) The channel adaptor 11 writes the data into the control manager CM-R.

(6) The control manager CM-R generates a check code corresponding to the new data, and transfers the generated check code to both control managers CM-M, CM-S.

Further, according to the aforementioned second conventional disk array apparatus, in order to increase the capacity and/or the speed, when an additional set(s) of control manager 10, channel adaptor 11 and/or disk adaptor 13 are to be installed, it is necessary to increase the number of ports of the disk enclosure 12, and also increase the number of connection cables between the disk adaptor 13 and the disk enclosure 12.

When increasing the number of ports of the disk enclosure 12, the number of cables corresponding to the number of the disk adaptors connected to one disk enclosure is to be increased also. This requires a larger mounting space, and therefore brings about a larger device size. Further, since two path systems for one disk enclosure are sufficient in view of a redundant configuration, it is not recommendable to increase the number of ports. Furthermore, since the number of connected disk adaptors is not constant but variable depending on a user's request, if a large number of ports are increased, it becomes wasteful against a small number of disk adaptors. On the other hand, if a small number of ports are increased, it becomes not possible to cope with a large number of disk adaptors. Namely, versatility is lost.

Meanwhile, in the first conventional disk array unit, when configuring a large-scale disk array unit provided with a multiplicity of major units, the number of connection lines between control managers 10 and routers 14 abruptly increases. This produces complicated connection relation, making it difficult to mount physically.

For example, in the configuration shown in FIG. 15, as shown in FIG. 17, the disk array apparatus has a mounting structure such that four (4) control managers 10 and four (4) routers 14 are connected through a back panel 15. In this case, as described earlier, the number of signal lines becomes 4×4× [the number of signal lines per path], as shown in FIG. 15. For example, as described before, when one path connection is constituted of a 64-bit PCI (parallel bus), the number of signal lines including control lines on back panel 15 becomes approximately 1,600 (=4×4×100). In order to wire the above signal lines, the printed board for back panel 15 requires six signal layers.

In case of a larger scale configuration, for example, constituted of eight (8) control managers (four sheets) 10 and eight (8) routers (four sheets) 14 connected through back panel 15, the required number of signal lines reaches approximately 6,400 (=8×8×100). The printed board for back panel 15 in this case requires four times as many as the above, namely 24 layers. It is hard to realize.

In place of the 64-bit PCI bus, when assuming a case of connection through a 4-lane PCI-Express bus of reduced signal lines, the required number of signal lines becomes 1,024 (=8×8×16). As compared to a PCI bus of 66 MHz, the PCI-Express bus is a high-speedbus of 2.5 Gbps in speed. In order to maintain the signal quality of the high-speed bus, it is necessary to use an expensive material for the substrate.

Furthermore, when using a low-speedbus, it is possible to exchange among wiring layers using vias. On the other hand, use of the vias in the high-speedbus produces degraded signal quality, which is to be avoided. Accordingly, when using the high-speed bus, it is necessary to allocate the entire signal lines so as not to intersect mutually. As compared to the case of a low-speed bus having the same number of signal lines, the substrate is required approximately twice as many signal layers, for example twelve signal layers. Further, the substrate is to be structured of expensive material, which is also not realistic.

Moreover, in the first conventional disk array apparatus 100, if a fault occurs in one of routers 14, the channel adaptors 11 and the disk adaptors 13 connected in subordination to the failed router 14 become unavailable immediately when the fault occurs in the router 14.

SUMMARY OF THE INVENTION

Accordingly, it is an object of the present invention to provide a data storage system and a data storage control apparatus, for improving both a response time to a mainframe host and a throughput of an open system host.

It is another object of the present invention to provide a data storage system and a data storage control apparatus, for achieving appropriate throughputs in the individual interfaces with both a mainframe host and an open system host.

It is still another object of the present invention to provide a data storage system and a data storage control apparatus, for easily realizing configurations from a small scale to a large scale without producing a mounting problem, guaranteeing a high throughput and high redundancy for both a mainframe host and an open system host.

In order to achieve the aforementioned objects, a data storage system according to the present invention includes: a plurality of memory devices storing data; a plurality of control modules which accesses the memory devices according to access instructions from an mainframe unit and an open system unit; a first channel adaptor which performs interface control to the mainframe unit; and a switch unit connected to the first channel adaptor and the plurality of control modules, and selectively switching the connection between the first channel adaptor and the plurality of control modules. The above each control module includes: a cache memory which stores a portion of data stored in thememory devices; a second channel adaptor which performs interface control to the open system unit; a disk adaptor performing interface control to the plurality of memory devices; and a control unit which controls the cache memory in response to the accesses, and accesses the memory devices via the disk adaptor.

Further, according to the present invention, a data storage control unit apparatus: a plurality of control modules which accesses a plurality of memory devices for storing data according to access instructions from an mainframe unit and an open system unit; a first channel adaptor which performs interface control to the upper-level mainframe unit; and a switch unit connected to the first channel adaptor and the plurality of control modules, and selectively switching the connection between the first channel adaptor and the plurality of control modules. The above each control module includes: a cache memory which stores a portion of data stored in the memory devices; a second channel adaptor which performs interface control to the open system unit; a disk adaptor performing interface control to the plurality of memory devices; and a control unit which controls the cache memory in response to the accesses, and accesses the memory devices via the disk adaptor.

Still further, according to the present invention, preferably, in response to a write access from the mainframe unit, the first channel adaptor accesses in parallel both a control module taking charge of the write data to be the target of the write access, and another control module having mirror data of the control module in charge, so as to perform mirroring.

Further, according to the present invention, preferably, the control module in charge decides whether a target write data block is existent in the cache memory of the control module, and when a write miss of which non-existence of the target write data is decided, both the control module in charge and the other control module access the memory device storing the target data block, and read the target data block.

Further, according to the present invention, preferably, the first channel adaptor connects to the mainframe unit from the start of access to the end of access according to the protocol of the mainframe unit, while the second channel adaptor disconnects the connection to the open system unit on receiving the access from the open system unit, according to the protocol of the open system unit.

Further, according to the present invention, preferably, a plurality of other switch units are provided between the plurality of control modules and the plurality of memory devices, and selectively switching between the disk adaptor of each control module and the plurality of memory devices, and the plurality of control modules and the plurality of other switch units are connected by means of a back panel.

Further, according to the present invention, preferably, the control module connects the control unit to the second channel adaptor through a high-speed serial bus of low latency, and the second channel adaptor is connected to the plurality of other switch units through serial buses by means of the back panel.

Further, according to the present invention, preferably, each control module and the other switch units are connected by means of the back panel, and the other switch units and the plurality of memory devices are connected through cables.

Further, according to the present invention, preferably, each control module and the switch units are connected by means of the back panel, and the switch units and the first channel adaptor are connected by means of the back panel.

Further, according to the present invention, preferably, the control module connects the control unit to the second channel adaptor through a high-speed serial bus of low latency.

Further, according to the present invention, preferably, the control unit in each control module decides whether the data access from the open system unit through the connected second channel adaptor is targeted to the data of which the control unit takes in charge, and when the data access is not targeted to the data of which the control unit takes in charge, the control unit requests the other control unit taking charge of the data to access the data requested from the open system unit, via the switch unit.

Further scopes and features of the present invention will become more apparent by the following description of the embodiments with the accompanied drawings.

BRIEF DESCRIPTION OF THE DRAWINGS

FIG. 5 shows a diagram illustrating a mounting structure of a control module according to one embodiment of the present invention.

DETAILED DESCRIPTION OF THE PREFERRED EMBODIMENTS

The preferred embodiments of the present invention are described hereinafter in order of data storage system, mounting structure, read/write processing of accesses by a mainframe host, read/write processing of accesses by an open system host, and other embodiments.

Data Storage System

Figure 1:
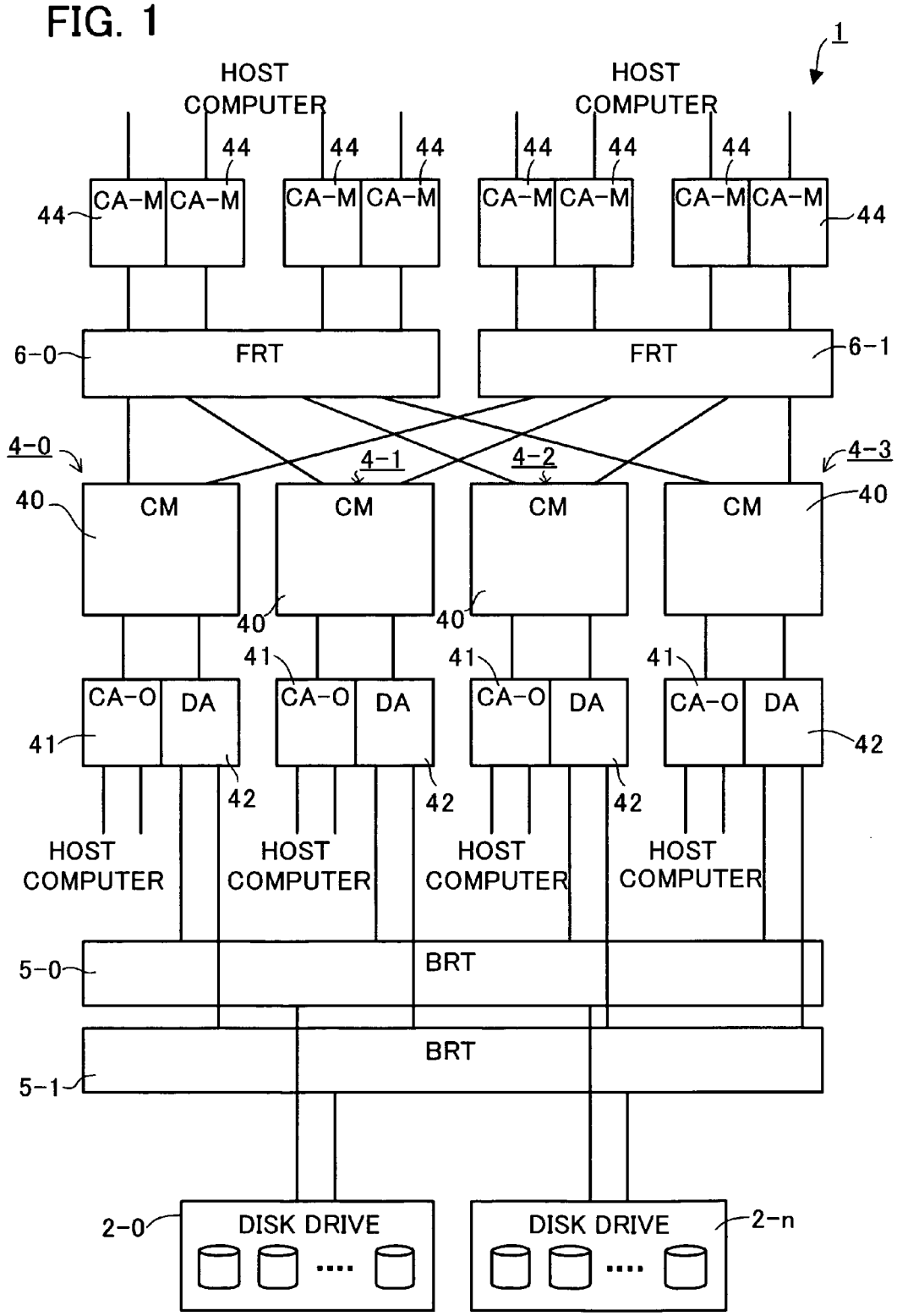
FIG. 1 shows a configuration diagram of a data storage system according to one embodiment of the present invention.
Figure 2:
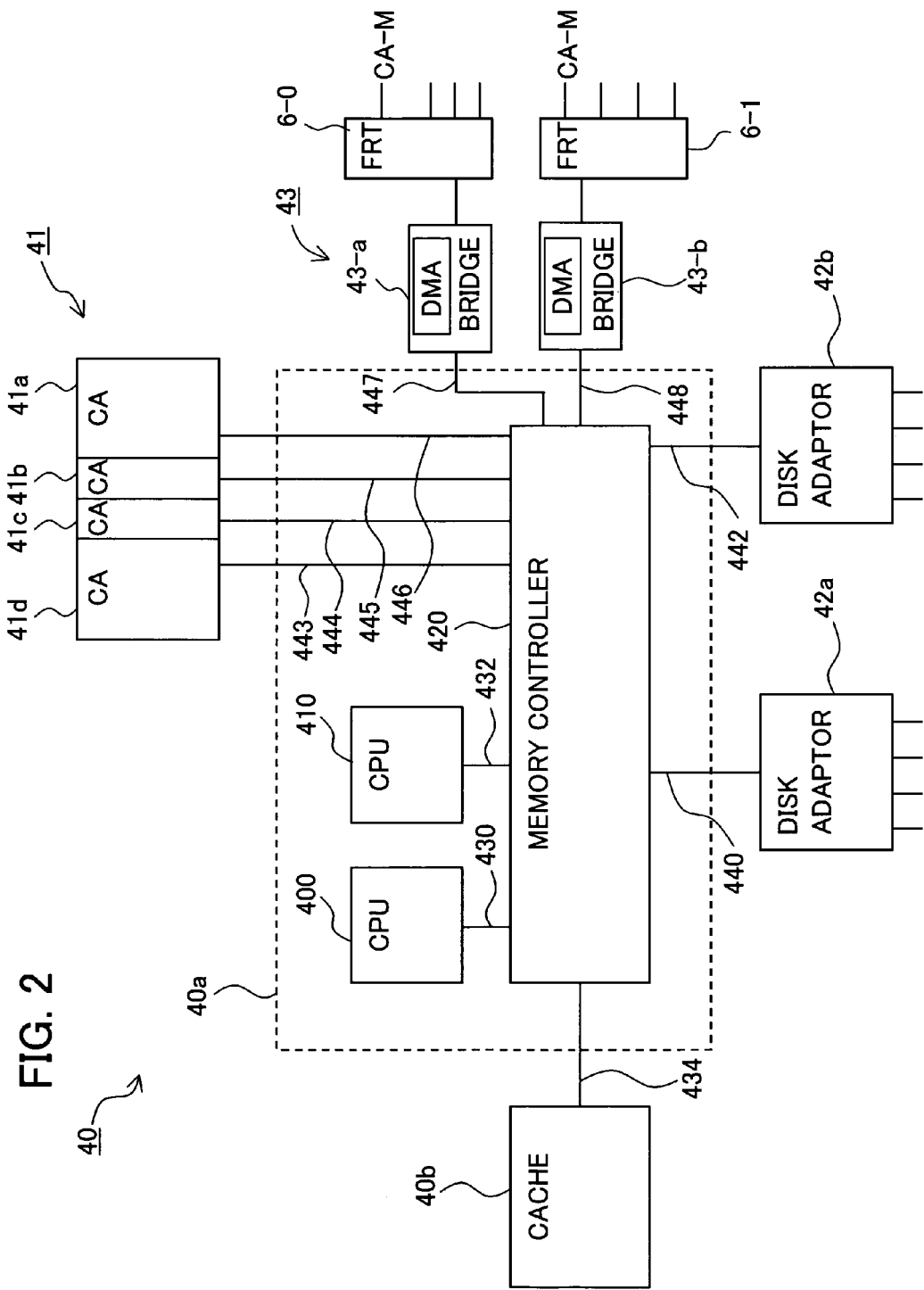
FIG. 2 shows a configuration diagram of a control module shown in FIG. 1.
Figure 3:
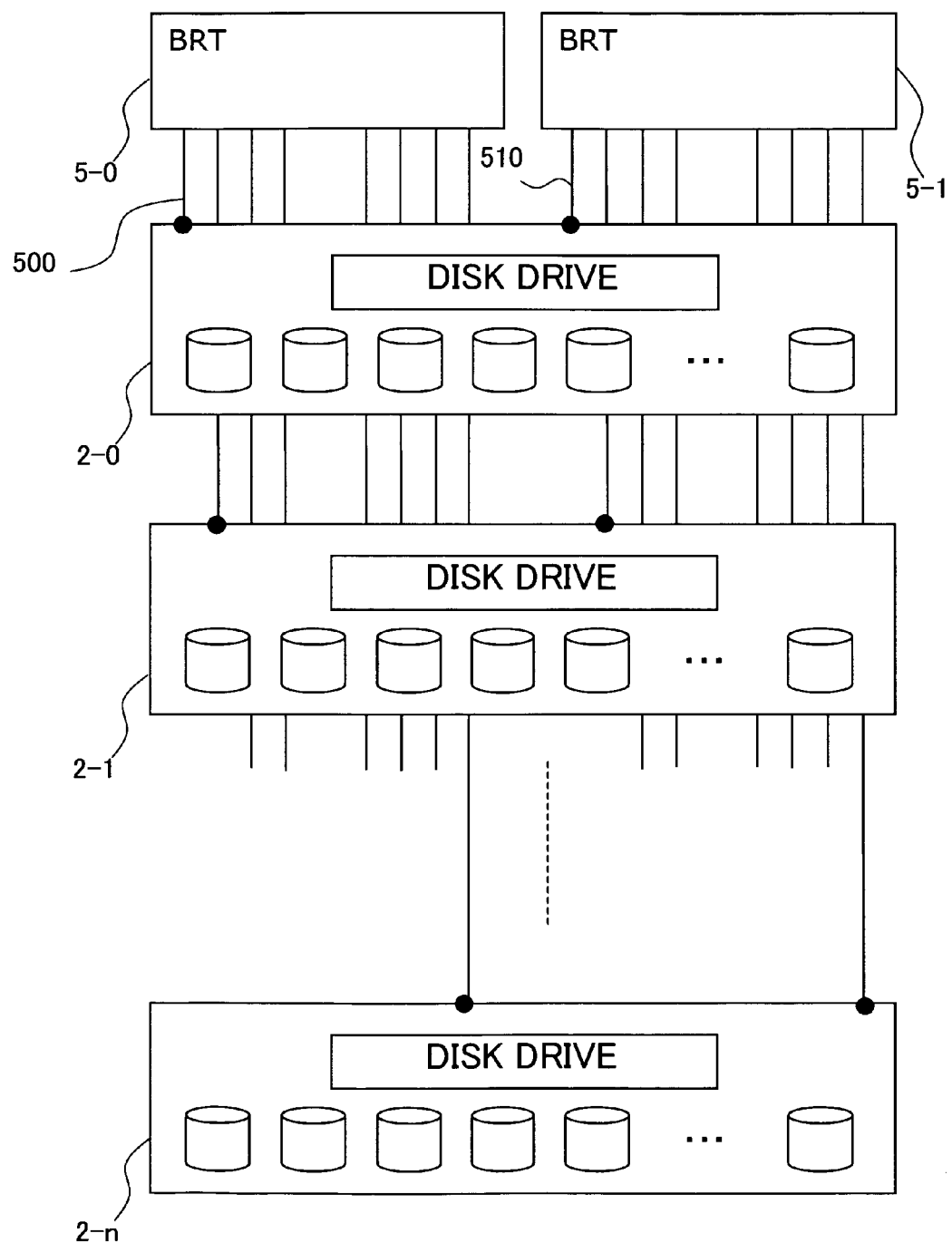
FIG. 3 shows a configuration diagram of a back-end router and a disk enclosure shown in FIGS. 1 and 2.
Figure 4:
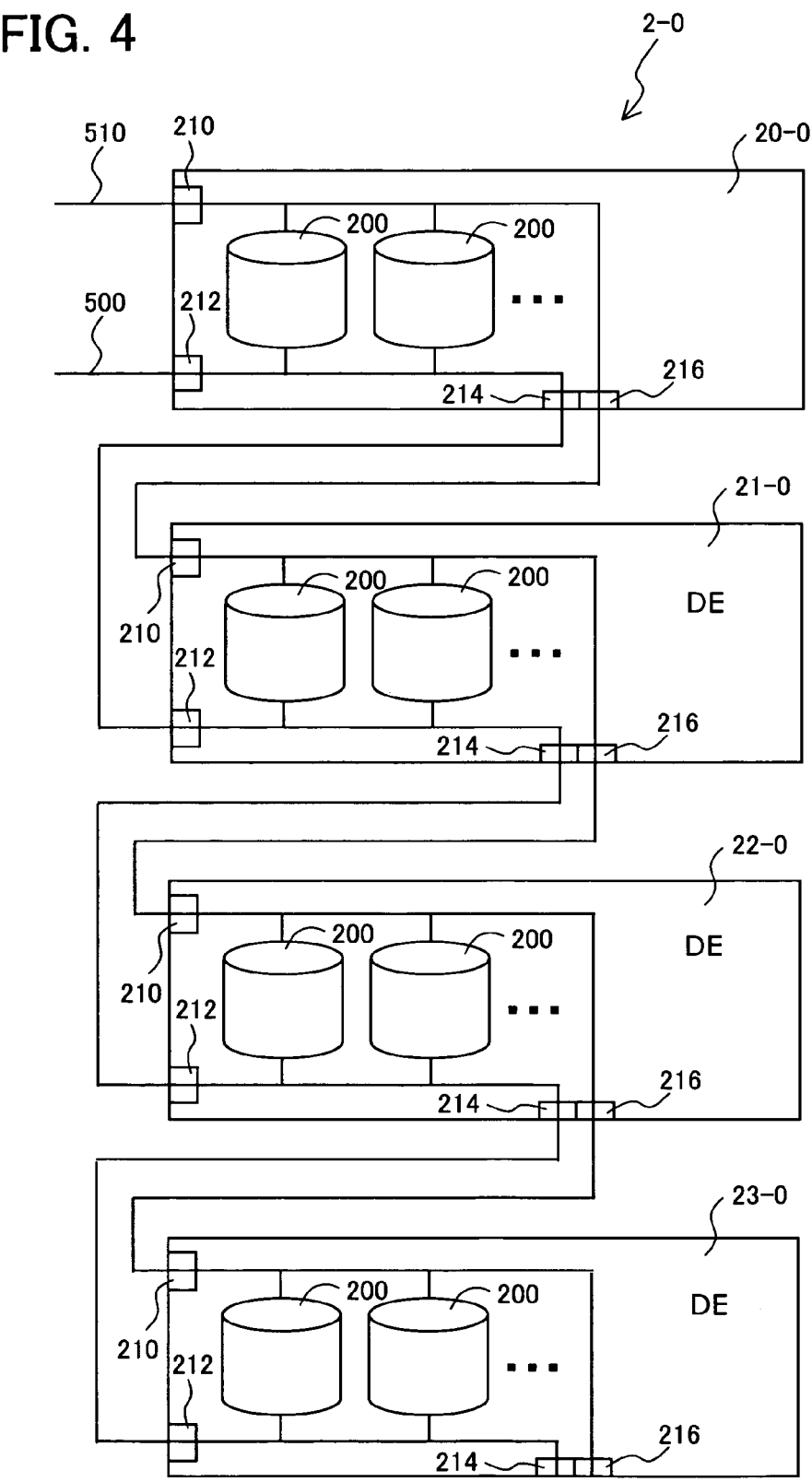
FIG. 4 shows a configuration diagram of a disk enclosure shown in FIGS. 1 and 3.

FIG. 1 shows a configuration diagram of a data storage system according to one embodiment of the present invention; FIG. 2 shows a configuration diagram of a control module shown in FIG. 1; FIG. 3 shows a configuration diagram of a back-end router and a disk enclosure shown in FIG. 1; and FIG. 4 shows a configuration diagram of a disk enclosure shown in FIGS. 1 and 3.

In FIG. 1, an example of a middle-scale storage system having four (4) control modules is shown. As shown in FIG. 1, a storage system 1 includes a plurality of disk enclosures 2-0-2-n for retaining data; a plurality (here, four) of control modules (or control managers) 4-0-4-3; a plurality (here, two) of back-end routers (first switch units, which are shown as BRT in the figure, and hereafter, also referred to as BRT) 5-0-5-1 provided between the plurality of control modules 4-0-4-3 and the plurality of disk enclosures 2-0-2-n; and a plurality (here, two) of front-end routers (second switch units, which are shown as FRT in the figure, and hereafter, also referred to as FRT) 6-0, 6-1.

Each control module 4-0-4-3 includes a control manager (control unit) 40, a channel adaptor (a second upper-level interface section, shown as CA-O in the figure) 41, and a disk adaptor (a lower-level interface section, shown as DA in the figure) 42. The above channel adaptor 41 is directly connected to the control manager 40, and also connected to an open system host (not shown). Meanwhile, the disk adaptor 42 has a pair of ports, each connected to each BRT 5-0, 5-1.

Further, each FRT 6-0, 6-1 is connected to the respective control managers 40, and also connected to second channel adaptors (first upper-level interface sections, shown as CA-M in the figure) 44. The above each first channel adaptor 44 is connected to a mainframe host (not shown).

Namely, according to the present embodiment of the invention, there are provided the first upper-level interface sections 44 for the mainframe hosts, and the second upper-level interface sections 41 for the open system hosts. Each control manager 40 is connected to the first upper-level interface sections 44 through FRT 6-0, 6-1, and directly connected to the second upper-level interface section 41.

Referring to FIG. 2, each control module 4-0-4-3 is described hereafter. The control manager 40 is provided for performing read/write processing based on a processing request (read request or write request) from a host computer. The control manager 40 includes a cache memory 40b and a cache control unit 40a.

The cache memory 40b retains a portion of data retained on a plurality of disks in the disk enclosures 2-0 - 2-n, and plays the role of so-called caching for the plurality of disks. The cache control unit 40b controls the cache memory 40b, the channel adaptor 41, the disk adaptor 42, and DMA (direct memory access) section 43. For this purpose, the cache control unit 40a includes one or a plurality (here, two) of CPU 400, 410 and a memory controller 420. The memory controller 420 controls read/write operation of each memory, and also switches paths.

The memory controller 420 is connected to the cache memory 40b through a memory bus 434, connected to CPU 400, 410 through CPU buses 430, 432. Further, the memory controller 420 is connected to the disk adaptors 42 (42a, 42b), through 4-lane high-speed serial buses (for example, PCI-Express buses) 440, 442 which will be described later. Similarly, the memory controller 420 is connected to the second channel adaptors 41 (41a, 41b, 41c, 41d) through 4-lane high-speed serial buses (for example, PCI-Express) 443, 444, 445, 446, and further connected to the DMA bridge circuits 43-a, 43-b through 4-lane high-speed serial buses (for example, PCI-Express) 447, 448.

As will be described later, by communicating through packets and providing a plurality of lanes of serial buses, the above high-speed bus such as the PCI-Express bus can communicate at high response speed and with a small delay, so-called a low latency, even if the number of signal lines is reduced.

The second channel adaptors 41a-41d are interfaces for open system hosts. The second channel adaptors 41a-41d are connected to different host computers. Further, preferably, each of the second channel adaptors 41a-41d is connected to the interface section of the corresponding host computer through a bus, for example, Fibre Channel or iSCSI. In such a case, an optical fiber or a coaxial cable is used as bus.

Further, each of the second channel adaptors 41a-41d is configured as a portion of each control module 4-0-4-3. Also, as interface sections with the corresponding host computer and the corresponding control module, it is necessary that a plurality of protocols be supported. Since the protocols to be loaded are not the same depending on the corresponding host computers, it is necessary that each channel adaptor 41a-41d can easily be exchanged depending on necessity. For this purpose, each channel adaptor 41a-41d is mounted on a different printed board from the printed board for control manager 40, a major unit of each control module 4-0-4-3, as will be described later in FIG. 6.

For example, as protocols to be supported in the second channel adaptor 41a-41d to interface the host computers, Fibre Channel and iSCSI (Internet Small Computer System Interface) compatible with Ethernet (registered trademark) are available, as described above. Further, as described earlier, each channel adaptor 41a-41d is directly coupled with the control manager 40 through a bus having been designed for connecting between LSI (large scale integration) and a printed board, such as the PCI-Express bus. By this, it becomes possible to obtain a high throughput required between each channel adaptor 41a-41d and the control manager 40.

The disk adaptors 42a, 42b are interfaces for the disk drives in the disk enclosures 2-0-2-n. The disk adaptors 42a, 42b is connected to BRT 5-0-5-1 connected to the disk enclosures 2-0-2-n, having four Fiber-Channel (FC) ports here.

Further, as described earlier, each disk adaptor 42a, 42b is directly connected to the control manager 40 through a bus having been designed for connecting between LSI (large scale integration) and a printed board, such as the PCI-Express bus. By this, it becomes possible to obtain a high throughput required between each disk adaptor 42a, 42b and the control manager 40.

The first channel adaptors 44 are interfaces for mainframe hosts, each connected to a different host computer. Further, preferably, each of the first channel adaptors 44 is connected to the interface section of the corresponding host computer through a bus, for example, FICON (registered trademark) or ESCON (registered trademark). In such a case, an optical fiber or a coaxial cable is used as bus.

Further, each of the above first channel adaptors 44 is connected to each DMA bridge sections 43-a, 43-b of the control manager 40 through FRT 6-0, 6-1. The above DMA bridge sections 43-a, 43-b are constituted of DMA bridge circuits having DMA circuits and bridge circuits.

Also, as interface sections to the corresponding mainframe host computers and the control modules 4-0-4-3, it is necessary that a plurality of protocols be supported. Since the protocols to be loaded are not the same depending on the corresponding host computers, it is necessary that each first channel adaptor 44 can easily be exchanged depending on necessity. For this purpose, each first channel adaptor 44 is mounted on a different printed board from the printed board for the control manager 40, a major unit of each control module 4-0-4-3, as will be described later in FIG. 6.

For example, as protocols to interface the mainframe host computer to be supported by first channel adaptor 44, there are FICON, ESCON, etc. as described above. Further, as shown in FIGS. 1 and 3, BRT 5-0-5-1 are multi-port switches for selectively switching and connecting the paths between each disk adaptor 42a, 42b of the control modules 4-0-4-3 and each disk enclosure 2-0-2-n, to enable communication therebetween.

As shown in FIG. 3, each disk enclosure 2-0-2-n is connected to a plurality (here, two) of BRT 5-0, 5-1. As shown in FIG. 4, a plurality of disk drives 200, each having two ports, are mounted on each disk enclosure 2-0-2-n.

The above each disk enclosure 2-0-2-n includes a plurality of unit disk enclosures 20-0-23-0, each having four connection ports 210, 212, 214 and 216. To expand the capacity, the above unit disk enclosures are connected in series.

Inside the disk enclosures 20-0-23-0, by means of a pair of FC cables from two ports 210, 212, the ports of each disk drive 200 are connected to the two ports 210, 212. The above two ports 210, 212 are connected to different BRT 5-0, 5-1, as having been described in FIG. 3.

As shown in FIGS. 1 and 3, each disk adaptor 42a, 42b in each control module 4-0-4-3 is connected to the entire disk enclosures 2-0-2-n. More specifically, the disk adaptor 42a in each control module 4-0-4-3 is connected to BRT 5-0 (refer to FIG. 3) which is connected to the disk enclosures 2-0-2-n, and connected to BRT 5-1 which is also connected to the disk enclosures 2-0-2-n.

As such, a plurality (here, two) of BRT 5-0, 5-1 are connected to each disk enclosure 2-0-2-n. At the same time, different disk adaptors 42*a*, 42*b* in each identical control module 4-0-4-3 are connected to each of the two BRT 5-0, 5-1 connected to each identical disk enclosure 2-0-2-n.

With such a configuration, each control module 4-0-4-3 can access the entire disk enclosures (disk drives) 2-0-2-n, through any disk adaptors 42*a*, 42*b*.

Further, each of the above disk adaptors 42*a*, 42*b* is configured as a portion of each control module 4-0-4-3, and mounted on a circuit board of the control manager 40, a major unit of each control module 4-0-4-3. Also, each disk adaptor 42*a*, 42*b* is directly coupled with the control manager 40, through, for example, PCI (peripheral component interconnect) bus. With this, it becomes possible to obtain a high throughput required between each disk adaptor 42*a*, 42*b* and the control manager 40.

Further, as shown in FIG. 2, each disk adaptor 42*a*, 42*b* is connected to each corresponding BRT 5-0-5-1 through Fibre Channel or Ethernet (registered trademark). In this case, as described later, the bus is provided on the printed board of the back panel with electric wiring.

As described before, the connections between the disk adaptors 42*a*, 42*b* of each control module 4-0-4-3 and BRT 5-0-5-1 are constituted of a one-to-one mesh connection so as to connect to the entire enclosures. Accordingly, as the number of control modules 4-0-4-3 (or, the number of disk adaptors 42*a*, 42*b*) increases, the number of connections increases. This results in a complicated connection relation, making physical mounting difficult. However, by adopting Fibre Channel having a small number of signal lines constituting the interface, it becomes possible to mount on the printed board for the connections between the disk adaptors 42*a*, 42*b* and BRT 5-0-5-1.

Additionally, when each disk adaptor 42*a*, 42*b* is connected by Fibre Channel to the corresponding BRT 5-0-5-1, BRT 5-0-5-1 function as switches of Fibre Channel. Similarly, the connections between each BRT 5-0-5-1 and the corresponding disk enclosures 2-0-2-n are made by, for example, Fibre Channel. In such a case, because the modules are different, the above connections are made by use of optical cables 500, 510 (refer to FIG. 3).

As shown in FIGS. 1 and 2, DMA bridge sections 43 are provided for mutually communicating with the first channel adaptors 44 and other control modules 4-0-4-3 via the front routers (FRT) 6-0, 6-1. The DMA bridge sections 43 take charge of communication and data transfer processing to/from the channel adaptors 44 and other control modules 4-0-4-3.

Each DMA bridge section 43 of each control module 4-0-4-3 is constituted as a portion of each control module 4-0-4-3, and mounted on a circuit board of the control manager 40, a major unit of each control module 4-0-4-3. Further, each DMA bridge section 43 is directly coupled with the control managers 40 through the aforementioned high-speed serial buses, and also communicates with the first channel adaptors 44 and the DMA bridge sections 43 of other control modules 4-0-4-3, via FRT 6-0, 6-1.

FRT 6-0, 6-1 are connected to the DMA bridge sections 43 of the plurality (in particular, three or more, and here, four) of the control modules 4-0-4-3, and also connected to the plurality of the first channel adaptors 44. FRT 6-0 and 6-1 selectively switch the above connections, so as to enable communication therebetween. With such a configuration, each of the first channel adaptors 44 executes communication and data transfer processing (for example, mirroring), initiated by access requests, etc. from host computers, to/from the plurality of the control managers 40 via FRT 6-0, 6-1.

Also, as shown in FIG. 2, each DMA bridge section 43 of each control module 4-0-4-3 is constituted of a plurality (here, two) of the DMA bridge sections 43-*a*, 43-*b*. Each of the two DMA bridge sections 43-*a*, 43-*b* uses the two FRT 6-0, 6-1. Further, as described earlier, the DMA bridge sections 43-*a*, 43-*b* are connected to control manager 40 through, for example, the PCI-Express bus, by which a low latency is achieved.

Further, in the communication and data transfer processing between the first channel adaptors 44 and each control module 4-0-4-3 (namely, the control manager 40 in each control module 4-0-4-3), amount of data transfer is large, so it is desired to be achieved with a shortened communication time. Therefore, a high throughput and a low latency (i.e. high response speed) are required. Accordingly, as shown in FIGS. 1 and 2, the connections between the DMA bridge sections 43 of each control module 4-0-4-3 and FRT 6-0, 6-1 are made by high-speed serial transmission buses (for example, PCI Express and Rapid-I/O) having been designed to satisfy requirements of both high throughput and low latency.

These PCI Express bus and Rapid-IO bus utilize 2.5 Gbps high-speed serial transmission. As bus interfaces therefor, a low amplitude differential interface called LVDS (low-voltage differential signaling) is adopted.

Mounting Structure

Figure 5:
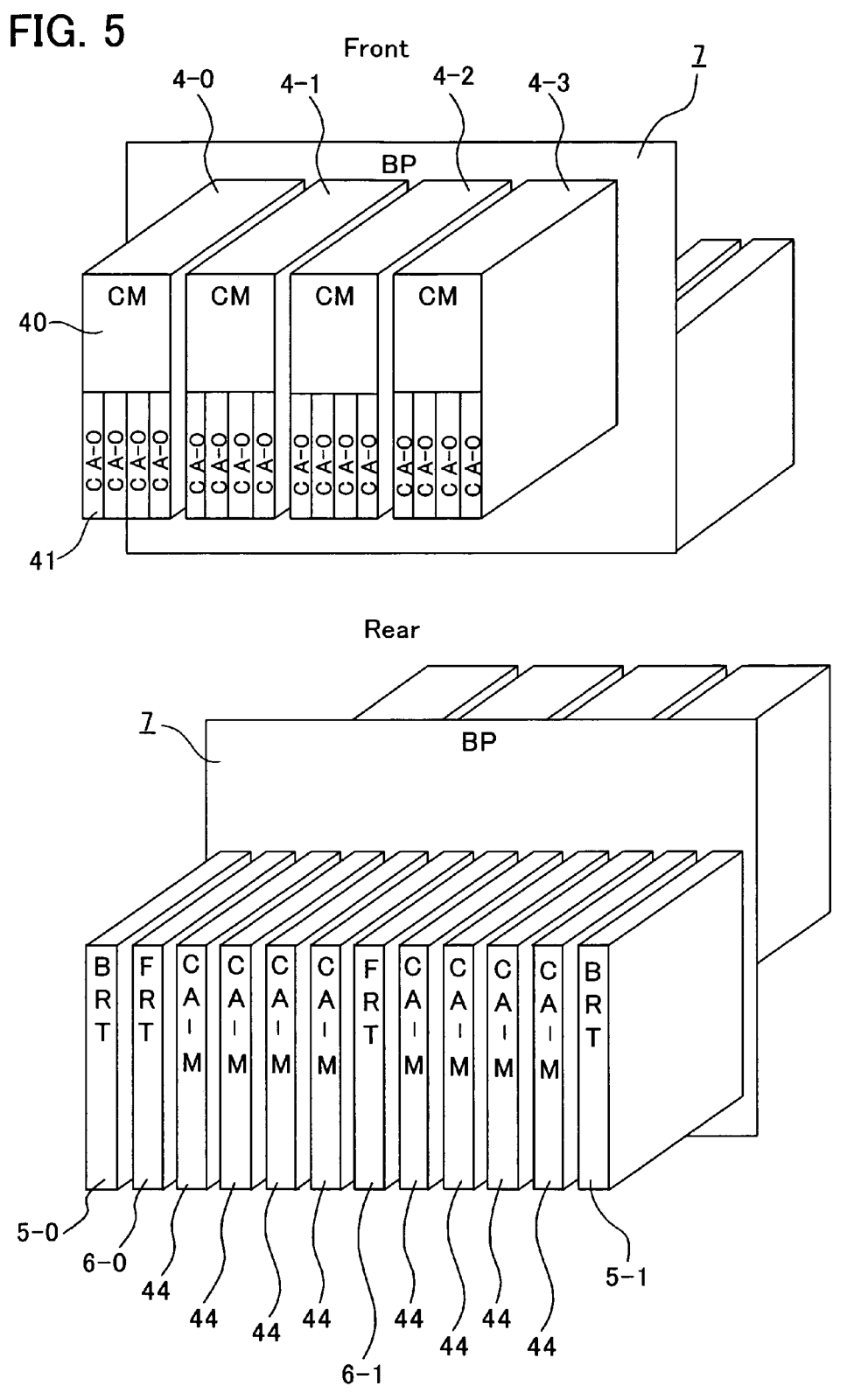
Figure 6:
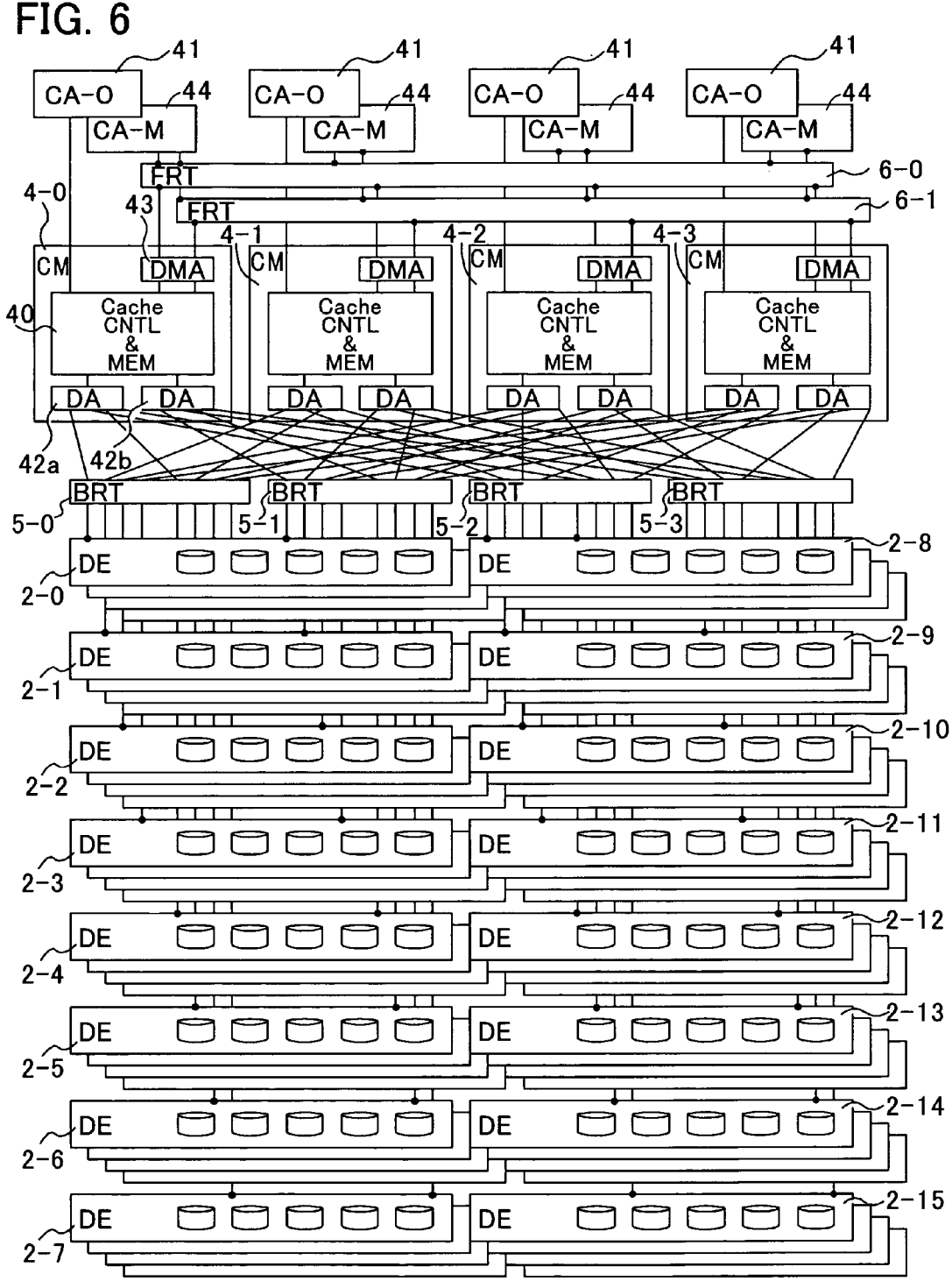
FIG. 6 shows a block diagram of the storage system according to the embodiment shown in FIG. 5.

FIG. 5 shows a diagram illustrating an example of the mounting structure of a control module according to one embodiment of the present invention. Also, FIG. 6 shows a block diagram of the data storage system having the above mounting structure.

In FIG. 5, a mounting diagram of the lower half of the storage unit enclosure is shown. Namely, on the upper side of the storage unit enclosure, a plurality of disk enclosures 2-0-2-3 are mounted. Meanwhile, on the lower half thereof, control circuits are mounted. As shown in FIG. 5, the lower half is divided into front and rear portions by means of a back panel 7. In the front and the rear of the back panel 7, slots are provided respectively. In a storage system of a middle-scale configuration shown in FIG. 6, four sheets (four units) of CM (control modules) 4-0-4-3 are disposed in the front side, while two sheets (two units) of FRT 6-0, 6-1, four sheets (four units) of BRT 5-0-5-3, and eight sheets of the first upper-level interface sections, or channel adaptors CA-O, 44 are disposed in the rear. Here, although two BRT 5-0 and 5-1 are shown in FIG. 5 for the sake of sample explanation, two more BRT 5-2 and 5-3 are provided in a similar manner.

In FIG. 5, four sheets of CM 4-0-4-3 and two sheets of FRT 6-0, 6-1 are connected by 4-lane PCI-Express buses via the back panel 7. The PCI-Express bus has four signal lines (because of differential and bidirectional structure), and therefore, there are sixteen (16) signal lines for four (4) lanes. Thus, the number of signal lines comes to 128 (=16×8) lines. Further, four sheets of CM 4-0-4-3 are connected to four sheets of BRT 5-0-5-3 by Fibre Channel through the back panel 7. Since the Fibre Channel has 4 (=1×2×2) signal lines because of differential and bidirectional structure, the number of signal lines in this portion comes to 128 (=4×8×4) lines.

Further, eight (8) sheets of CA-M 44 are connected to two sheets of FRT 6-0, 6-1 by 4-lane PCI-Express buses through the back panel 7. Since the number of signal lines per PCI-Express bus is four (because of differential and bidirectional structure), there are 16 signal lines for 4 lanes. Thus, the number of signal lines in this portion comes to 128 (=16×8).

Figure 9:
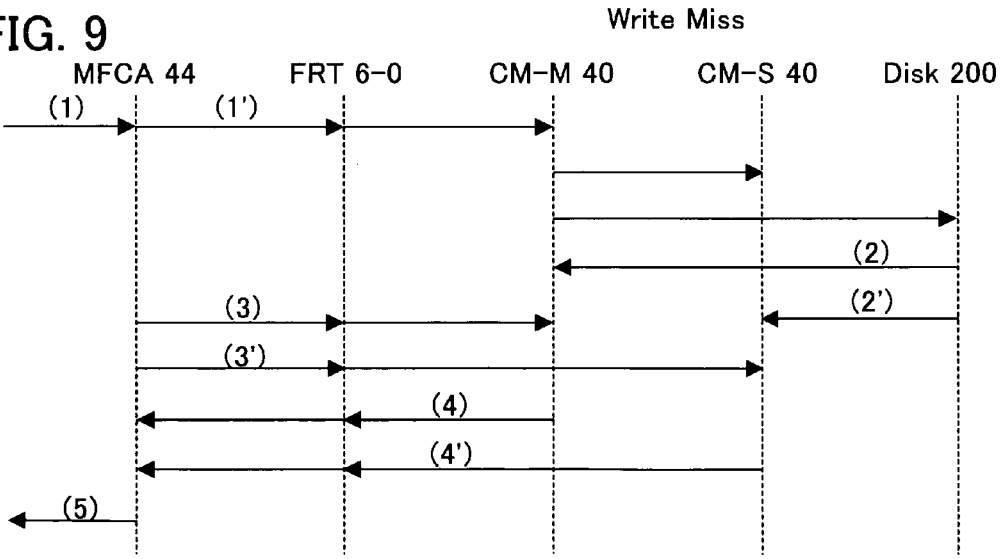
FIG. 9 shows an explanation diagram of 'write miss' processing shown in FIG. 7.

As such, by using different types of buses for different connection points, even in a large-scale storage system shown in FIG. 9, the connections among four sheets of CM 4-0-4-3, two sheets of FRT 6-0, 6-1, four sheets of BRT 5-0-5-3, and eight sheets of CA-M 44 are obtained by means of 384 signal lines. Such the number of signal lines can be mounted sufficiently on the back panel 7. Also, it is sufficient that a board has six signal-line layers, which is also within an obtainable range in view of cost.

Furthermore, each disk adaptor 42a, 42b of the control modules 4-0-4-3 is connected to the entire disk drives 200 through BRT 5-0-5-3. Each control module 4-0-4-3 can access the entire disk drives through any disk adaptors 42a, 42b.

Further, each disk adaptor 42a, 42b is mounted on a circuit board of each control manager 40, a major unit of each control manager 4-0-4-3. Also, each disk adaptor 42a, 42b can be coupled directly with the control manager 40 through a low latency bus such as PCI-Express, and thereby a high throughput can be achieved.

Moreover, the connections between the disk adaptors 42a, 42b of each control module 4-0-4-3 and BRT 5-0-5-3 are constituted of a one-to-one mesh connection. Therefore, even when the number of the control modules 4-0-4-3 (or, the number of each disk adaptor 42a, 42b) provided in the system is increased, it is possible to adopt Fibre Channel, having a small number of signal lines constituting the interface, to the connections between the disk adaptors 42a, 42b and BRT 5-0-5-3. Thus, a problem of mounting can be solved.

Also, in the communication and data transfer processing between each control module 4-0-4-3 (namely, the control manager 40 in each control module 4-0-4-3) and between the control modules 4-0-4-3 and the first interface sections 44, a large amount of data are transferred, so it is desirable that a communication time is short. Therefore, a high throughput and a low latency (i.e. high response speed) are required. Accordingly, as shown in FIG. 2, the connections between the DMA bridge sections 43 of each control module 4-0-4-3 and FRT 6-0, 6-1, as well as between FRT 6-0, 6-1 and the first interface sections 44, are made by the PCI Express buses using high-speed serial transmission having been designed to satisfy requirements of both high throughput and low latency.

Read/write Processing of a Mainframe Host

Figure 7:
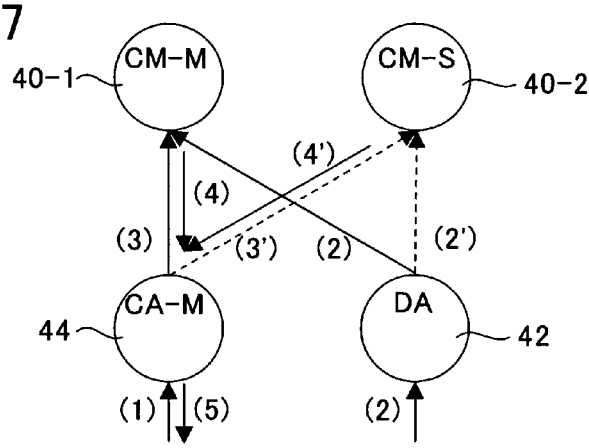
FIG. 7 shows an explanation diagram of read/write processing of a mainframe host, according to one embodiment of the present invention.
Figure 8:
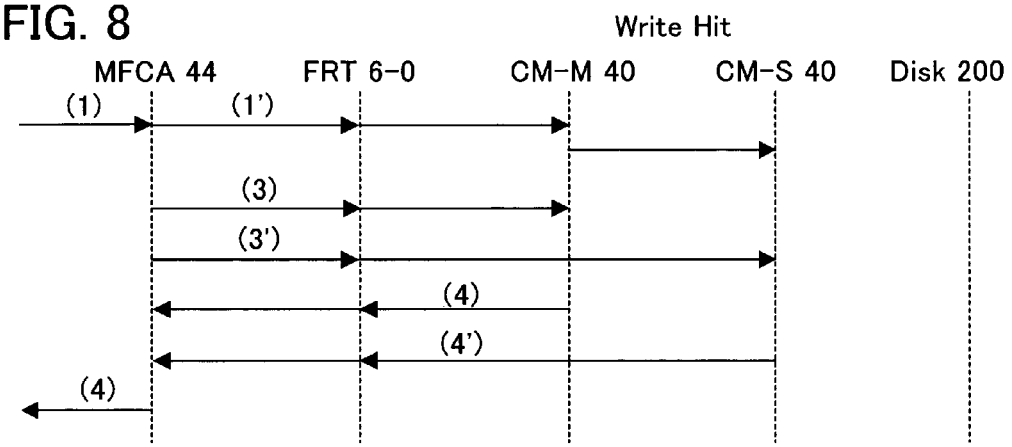
FIG. 8 shows an explanation diagram of 'write hit' processing shown in FIG. 7.

Next, write processing of the data storage system shown in FIGS. 1 through 4, initiated from the mainframe host is described; FIG. 7 shows an explanation diagram of write operation in the configuration shown in FIGS. 1 and 2; FIG. 8 shows an explanation diagram of write hit operation shown in FIG. 7; and FIG. 9 shows an explanation diagram of write miss processing shown in FIG. 7.

Hereafter, the operation shown in FIG. 7 will be described referring to FIGS. 8 and 9. In the figure, a symbol '40-1' is defined as a master control manager viewed from a mainframe channel adaptor 44, while a symbol '40-2' is defined as a slave control manager. The following description is based on the assumption that a mirror data of the master control manager 40-1 is retained in the slave control manager 40-2.

(1) The mainframe channel adapter 44 receives a write data from a mainframe host.

(1') The channel adaptor 44 inquires the control manager 40-1 of the address of the cache memory 40b in which the write data is to be written, through the front router FRT 6-0 (6-1). The control manager 40-1 decides whether the target block including the write data is existent in the cache memory 40b.

(2) In the case that the target data is not existent in the cache memory 40b (that is, 'write miss' shown in FIG. 9), the control manager 40-1 reads out the block including the write data from the disk drive 200 to a buffer, via the disk adaptor 42.

(2') Also, slave (mirrored) control manager 40-2 also reads out the block including the write data from the disk drive 200 to a buffer, via the disk adaptor 42 (refer to FIG. 9).

(3) Then, when the channel adapter 44 receives the response from the control managers 40-1, 40-2, the channel adaptor 44 writes the write data into the buffer of the control manager 40-1 via the front router FRT 6-0 (6-1). The control manager 40-1 generates a check code afresh, using the write data written in either the buffer (in the case of 'write miss') or the cache memory (in the case of 'write hit' shown in FIG. 8) and the remaining data in the block concerned existent in the cache memory (refer to FIGS. 8 and 9).

(3') Also, the channel adaptor 44 writes the write data into either the buffer of the slave control manager 40-2 (in the case of write miss) or the cache memory (in the case of write hit shown in FIG. 8), via the front router FRT 6-0 (6-1). Namely, the write data is written into the cache memory 40b in at least one control manager 40-2 which is different from the control manager 40-1 concerned. The control manager 40-2 also generates a check code afresh, using the write data written into the buffer and the remaining block data in the cache memory.

(4) The control manager 40-1 writes the write block having the check code added thereto into the cache memory 40b, and then notifies the channel adaptor 44 of the completion of the write processing.

(4') Similarly, the control manager 40-2 writes the write block having the check code added thereto into the cache memory 40b, and notifies the channel adaptor 44 of the completion of the write processing.

(5) The channel adaptor 44 notifies the host about the completion of the write processing.

As such, the mainframe channel adaptor 44 is connected to the plurality of control managers 40 via the front router FRT 6-0 (6-1). Accordingly, mirroring in the write processing can be performed in parallel. Thus, it becomes possible to obtain high-speed write processing of the mainframe host, in which the connection is maintained until the processing is completed. In particular, even in case of write miss, disk read processing can be performed in parallel, which contributes to high-speed processing in case of write miss.

Further, since the disk adaptor 42 is directly connected to the control manager 40, read processing with a disk drive can be performed at high speed. The above read processing is described below, referring to FIG. 10.

(1) The control unit 40a (CPU) in the control manager 40 generates an FC header and a disk descriptor in a descriptor area in the cache memory 40b. The descriptor is an order for requesting data transfer to a data transfer circuit, which includes a cache memory address of the FC header, a cache memory address of the data to be transferred and a data byte count thereof, and a logical address of the disk for data transfer.

(2) A data transfer circuit in the disk adaptor 42 is initiated.

(3) The initiated data transfer circuit in the disk adaptor 42 reads out the descriptor from the cache memory 40b.

(4) The initiated data transfer circuit in the disk adaptor 42 reads out the FC header from the cache memory 40b.

(5) The initiated data transfer circuit in the disk adaptor 42 decodes the descriptor, and obtains requested disk, top address and byte count. Then, the FC header is transferred from Fibre Channel 500 (510) to the target disk drive 200. The disk drive 200 reads out the requested target data, and transmits the target data to the data transfer circuit in the disk adaptor 42 via Fibre Channel 500 (510).

(6) On completion of reading and transmitting the requested target data, the disk drive 200 transmits a completion notification to the data transfer circuit in the disk adaptor 42 via Fibre Channel 500 (510).

(7) On completion of the reception, the initiated data transfer circuit in the disk adaptor 42 reads out a read data from the memory in the disk adaptor 42, and stores the read data into the cache memory 40*b*.

(8) On completion of the read data transfer, the initiated data transfer circuit in the disk adaptor 42 notifies the control manager 40 of the completion by an interruption.

(9) The control unit 40*a* in the control manager 40 obtains an interruption cause from the disk adaptor 42, and confirms the read transfer.

(10) The control unit 40*a* in the control manager 40 examines a completion pointer of the disk adaptor 42, and confirms the completion of the read transfer.

In order to obtain sufficient performance, it is necessary to provide high throughput in the entire connections. Meanwhile, since a large quantity of signals is exchanged (in the figure, seven times) through the connection between the control unit 40*a* and the disk adaptor 42, it is particularly necessary to adopt buses having low latency.

In the above embodiment, both the PCI-Express (4 lanes) and the Fibre Channel (4G) are adopted as high throughput connections. Although the connection by the PCI-Express produces a low latency, the connection by the Fibre Channel produces comparatively a large latency (that is, a comparatively long time is consumed in data transfer).

Figure 15:
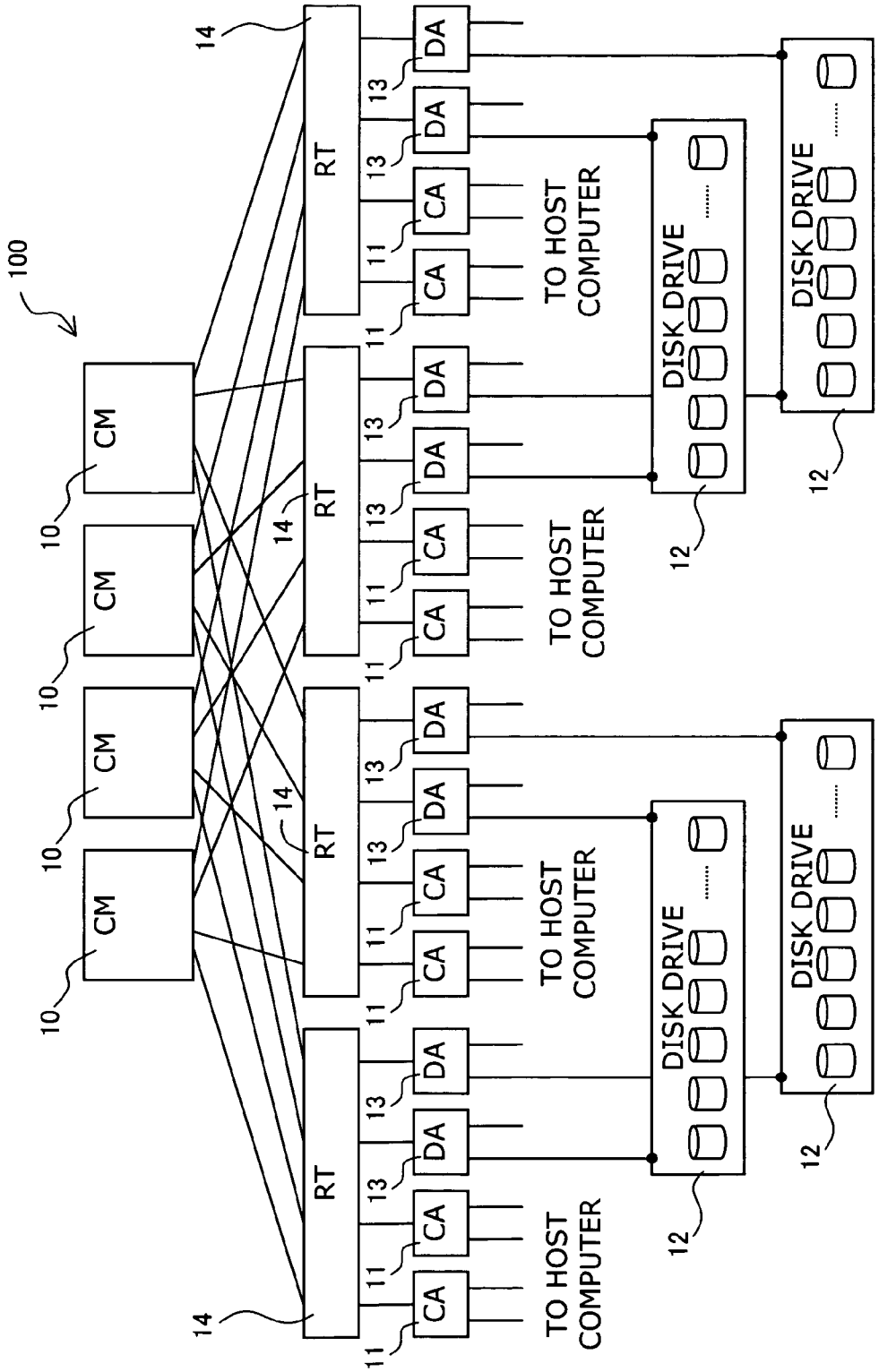
FIG. 15 shows a configuration diagram of a first conventional storage system.
Figure 16:
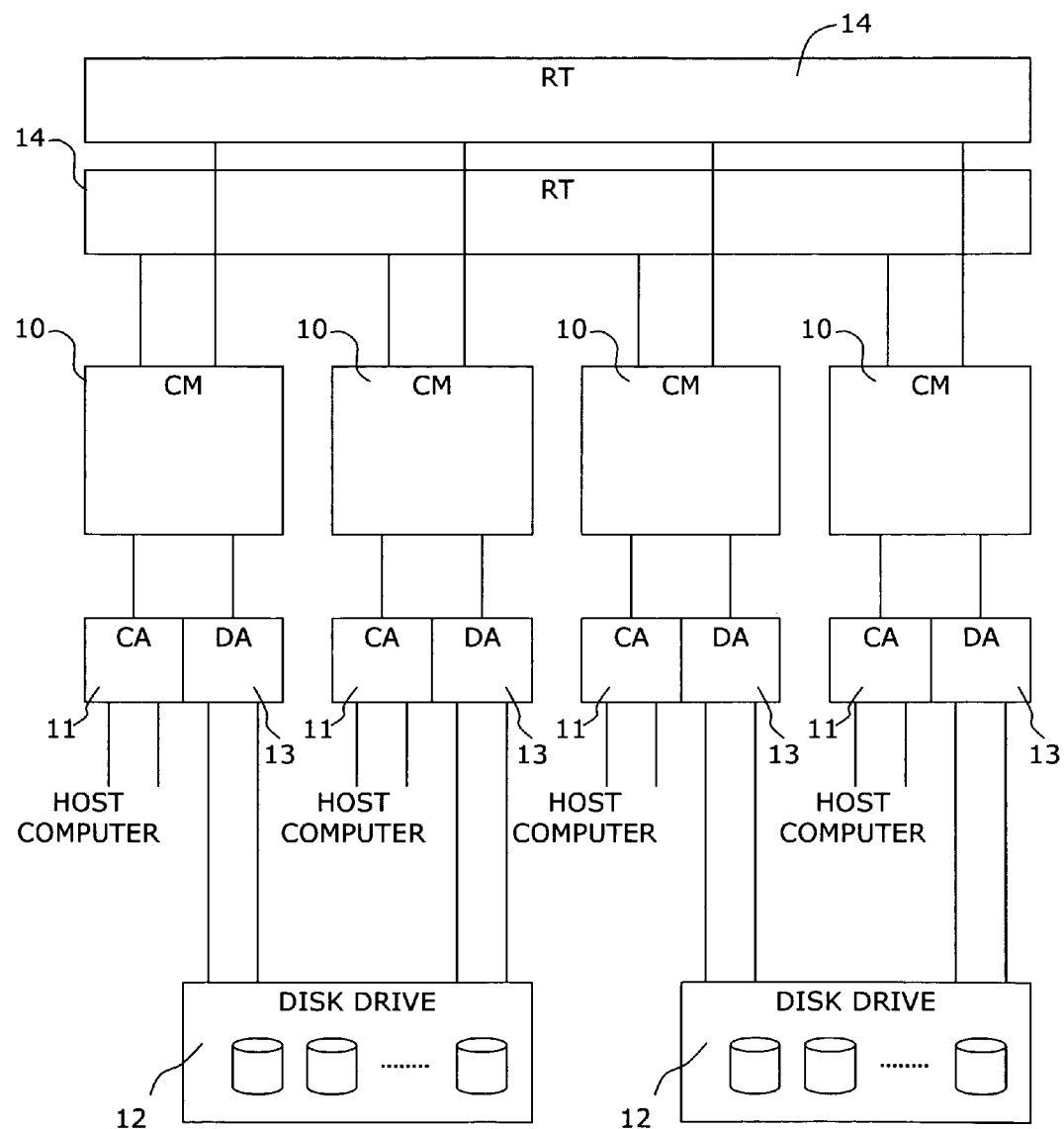
FIG. 16 shows a configuration diagram of a second conventional storage system.
Figure 17:
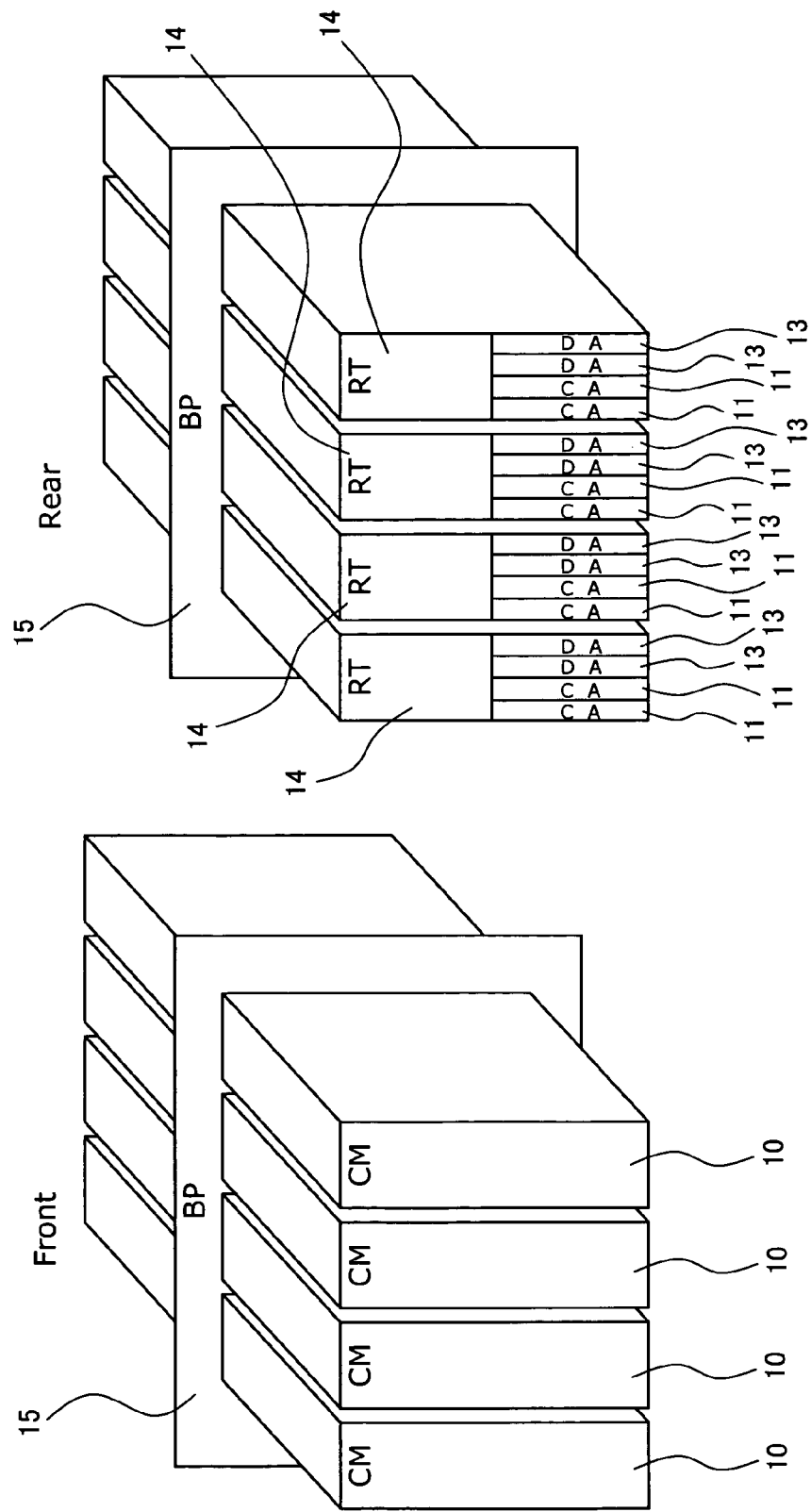
FIG. 17 shows a diagram illustrating a mounting structure of the first conventional storage system shown in FIG. 15.

In the first conventional technique, the Fibre Channel producing a large latency cannot be adopted in RT 14 (refer to FIG. 15) between CM 10 and DA 13/CA 11. In contrast, according to the present invention, it is possible to adopt the Fibre Channel for BRT 5-0-5-1 because of the configuration shown in FIG. 1.

Namely, in order to achieve a low latency, it is not possible to reduce the number of signal lines of the bus more than a certain extent. According to the present invention, it is possible to adopt Fibre Channel having a reduced number of signal lines in the connection between disk adaptor 42 and BRT 5-0. This enables reduction of the signal lines by means of the back panel, which becomes effective in terms of mounting.

Figure 11:
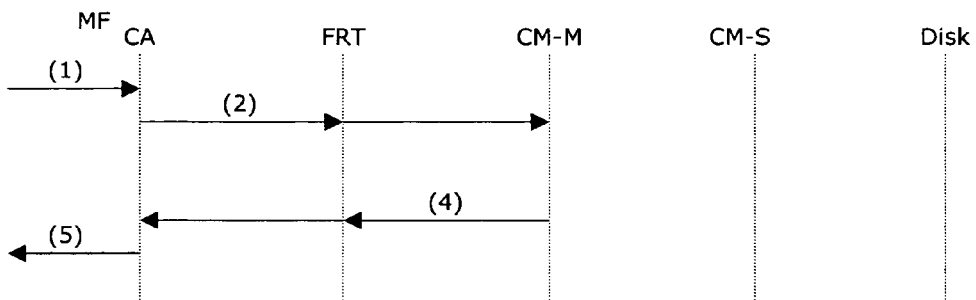
FIG. 11 shows an explanation diagram of 'read hit' processing shown in FIG. 7.
Figure 12:
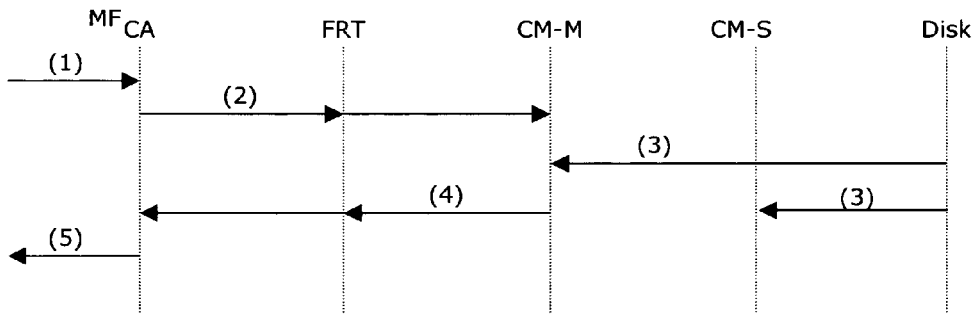
FIG. 12 shows an explanation diagram of 'read miss' processing shown in FIG. 7.

Next, read processing initiated from a host will be described hereafter. FIG. 11 shows an explanation diagram in case of read hit. FIG. 12 shows an explanation diagram in case of read miss.

(1) The mainframe channel adaptor 44 receives a read command from a mainframe host.

(2) The channel adaptor 44 inquires the control manager 40-1 about the address of the cache memory 40*b* in which the read data is existent via the front router FRT 6-0 (6-1). The control manager 40-1 decides whether a target block including the read data is existent in the cache memory 40*b*.

(3) In the case the target data is not existent in the cachememory 40*b* (i.e. in case of read miss), the control manager 40-1 reads out the block including the read data of interest from the disk drive 200 to a buffer via the disk adaptor 42 (refer to FIG. 12). Also, the slave control manager 40-2 reads out a block including the read data from the disk drive 200 to a buffer via the disk adaptor 42 (refer to FIG. 12).

(4) The control managers 40-1, 40-2 writes the read block into the cache memory 40*b*. The control manager 40-1 then notifies the channel adaptor 44 of the read data.

(5) The channel adaptor 44 transfers the read data to the host.

Read/write Processing of an Open System Host

Figure 13:
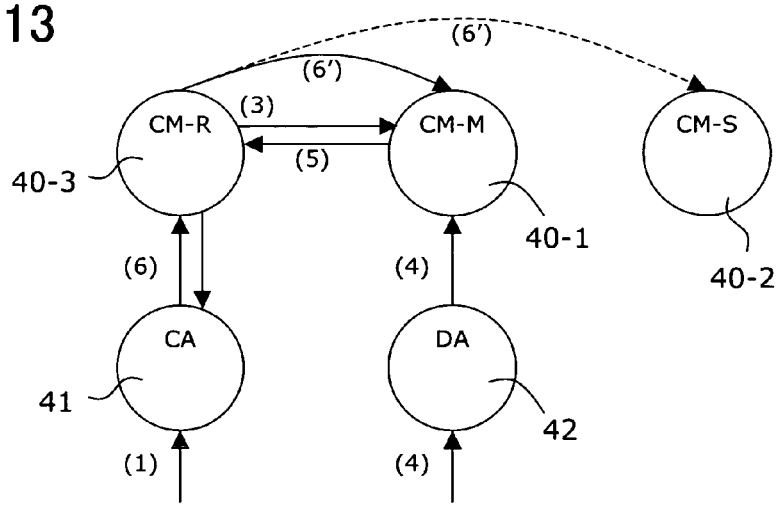
FIG. 13 shows an explanation diagram of read/write processing of an open system host, according to one embodiment of the present invention.

FIG. 13 shows an explanation diagram of read/write processing of an open system host, according to one embodiment of the present invention.

(1) An open system channel adaptor 41 receives a write data from an open system host.

(2) The open system channel adaptor 41 notifies the connected control manager 40-3. The connected control manager 40-3 decides whether the control manager takes charge of the write data processing.

(3) The control manager 40-3 having received the data confirms the control manager taking charge. If the control manager 40-3 is not the control manager in charge, the control manager 40-3 concerned inquires the control manager 40-1 in charge (CM-M) whether the state is a 'write hit'.

(4) In case that the state is not the write hit, the control manager in charge 40-1 (CM-M) reads out the remaining data from the disk so as to generate a check code, via the disk adaptor 42. The disk adaptor 42 writes the data into the control manager 40-1 (CM-M).

(5) The control manager 40-1 in charge (CM-M) transfers the data to the receiving control manager 40-3 (CM-R).

(6) The open system channel adaptor 41 writes the data into the receiving control manager 40-3 (CM-R). The receiving control manager 40-3 (CM-R) generates a check code for the new data.

(6') The received control manager 40-3 (CM-M) transfers the write data having the check code added thereto, to both control manager 40-1 (CM-M) and control manager 40-2 (CM-S) having the mirror data thereof, via the FRT 6-0 (or 6-1). Then, the received control manager 40-3 notifies the channel adaptor 41 of the completion of the write processing. On receipt of the notification from the control manager 40-3, the channel adaptor 41 sends a write completion notification to the open system host.

Further, in case of the write hit in the above (3), the received control manager 40-3 (CM-R) transfers the write data to both the control manager 40-1 (CM-M) and the control manager 40-2 (CM-S) having the mirror data thereof, via the FRT 6-0 (or 6-1), in place of the steps (4), (5), (6) and (6'). Each control managers 40-1 and 40-2 generates the check code. Then a write completion notification of the data is sent to the channel adaptor 41. On receipt of the notification from the control manager 40-3, the channel adaptor 41 notifies the open system host of the write completion.

Figure 10:
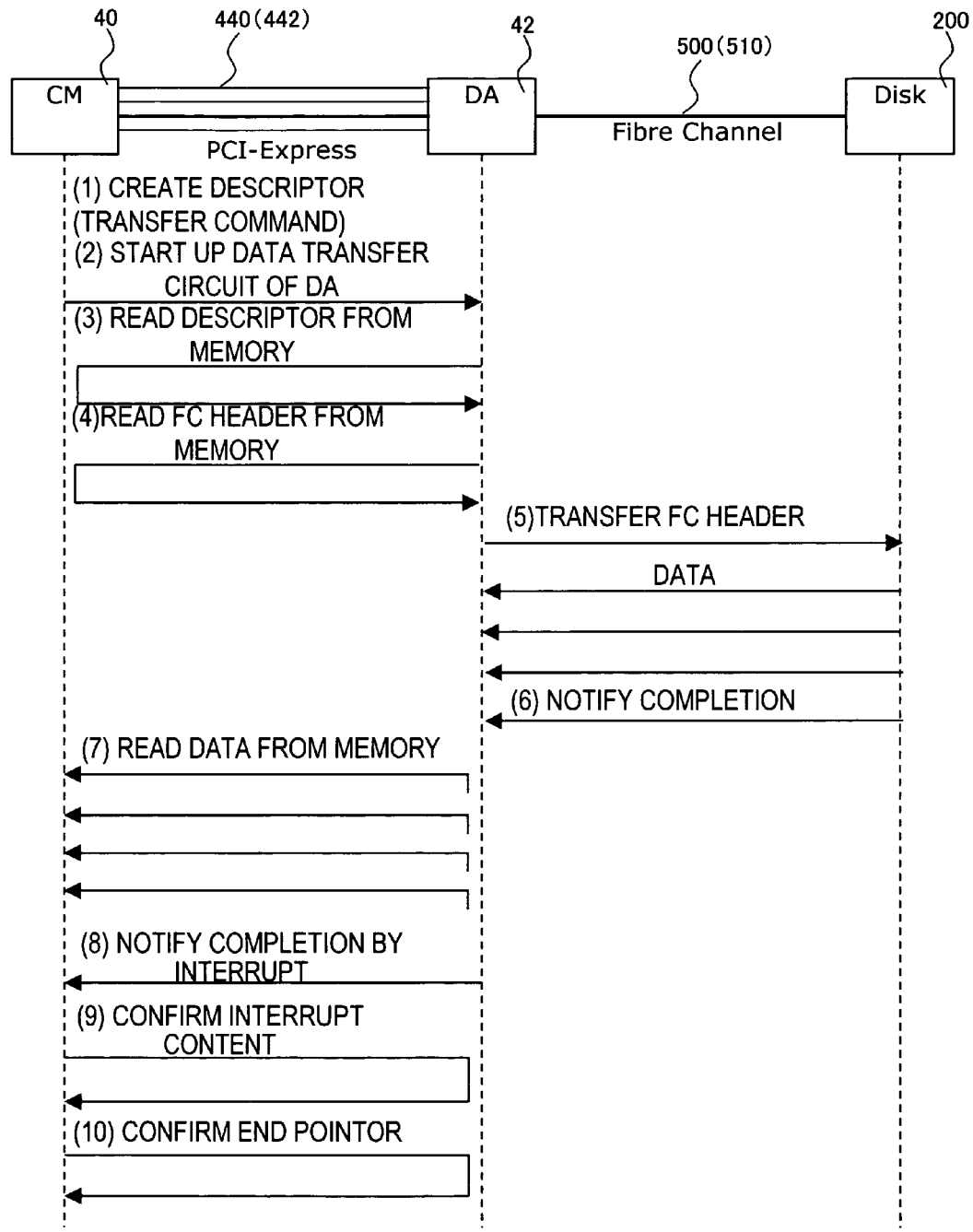
FIG. 10 shows an explanation diagram of read processing shown in FIG. 7.

As described in FIG. 10, disk read can also be performed with a low latency, contributing to the improvement of throughput.

When a read request is received from a host computer, first, the channel adaptor 41 sends a request to the connected control manager 40-3. The control manager 40-3 having received the request confirms the control manager taking charge. If the control manager that receives the request is in charge, the control manager concerned either extracts data from the cache memory, or reads out data from the disk via the disk adaptor 42, and then transmits the data to the channel adaptor 41.

Meanwhile, in the case another control manager 40-2 is taking charge, the control manager 40-3 requests to the control manager 40-2 in charge. The data returned from the control manager 40-2 in charge to the receiving control manager 40-3 through the similar read operation is transferred to the channel adaptor 41. The channel adaptor 41 then transfers the data received from the control manager 40-3 to the open system host computer.

Figure 14:
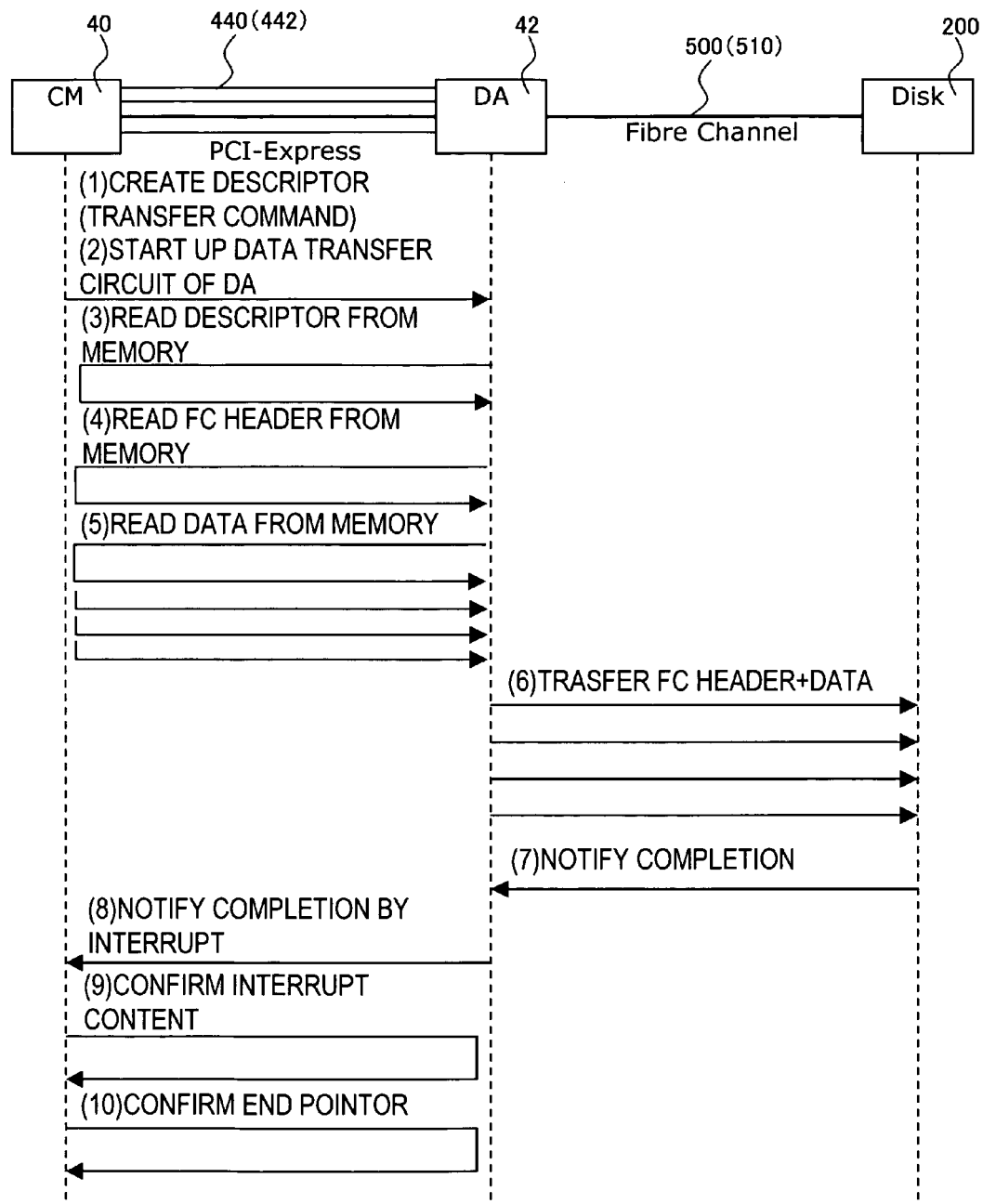
FIG. 14 shows an explanation diagram of write back processing in the configuration shown in FIGS. 7 and 13.

Next, it is necessary that the aforementioned write data be written back to the target disk drive (write back). The cache control unit 40a writes back the write data in the cache memory 40b to the disk drive 200 retaining the target data concerned, according to an internal schedule. Referring to FIG. 14, the write processing performed to the disk drive is described below.

(1) The control unit 40a (CPU) in the control manager 40 generates an FC header and a descriptor in a descriptor area in the cache memory 40b. The descriptor is an order for requesting data transfer to a data transfer circuit, which includes a cache memory address of the FC header, a cache memory address of the data to be transferred and a data byte count thereof, and a logical address of the disk for data transfer.

(2) The data transfer circuit in the disk adaptor 42 is initiated.

(3) The initiated data transfer circuit in the disk adaptor 42 reads out the descriptor from the cache memory 40b.

(4) The initiated data transfer circuit in the disk adaptor 42 reads out the FC header from the cache memory 40b.

(5) The initiated data transfer circuit in the disk adaptor 42 decodes the descriptor, obtains requested disk, top address and byte count, and reads out data from the cache memory 40b.

(6) After the readout is completed, the data transfer circuit in the disk adaptor 42 transfers the FC header and the data from Fibre Channel 500 (510) to the target disk drive 200. The disk drive 200 then writes the transferred data into the disk incorporated therein.

(7) On completion of writing the data, the disk drive 200 transmits a completion notification to the data transfer circuit in the disk adaptor 42 via Fibre Channel 500 (510).

(8) On receipt of the completion notification, the initiated data transfer circuit in the disk adaptor 42 notifies the control manager 40 of the completion by an interruption.

(9) The control unit 40a in the control manager 40 obtains an interruption cause from the disk adaptor 42, and confirms the write operation.

(10) The control unit 40a in the control manager 40 examines a completion pointer of the disk adaptor 42, and confirms the completion of the write operation.

In FIG. 14, similarly to FIG. 10, the arrows indicate packet transfer such as data, and the U-shape arrows indicate data read, by which states of data returned against a data request from one side are shown. As such, since confirmation of the initiation and completion states in the control circuit of the disk adaptor 42 is required, seven times of exchanges per one data transfer are performed between the control manager 40 and the disk adaptor 42. While, twice exchanges is performed between the disk adaptor 42 and the disk drive 200.

With this, it is understood that a low latency is required in the connection between the cache control unit 40 and the disk adaptor 42, and that it is possible to use interface having small number of signal lines between the disk adaptor 42 and the disk drive 200.

OTHER EMBODIMENTS

In the description of the above-mentioned embodiment, the signal lines within control module 4-0 are explained using PCI-Express. However, it may also be possible to use other high-speed serial buses, such as Rapid IO. The number of channel adaptors 41, 44 and/or disk adaptors 42 may be increased or decreased depending on necessity.

As disk drives, storage devices such as hard disk drive, optical disk drive, magneto-optical disk drive are applicable. Further, the protocols for the open system hosts and the mainframe hosts are not limited to those in the above description. Other protocols are applicable.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A data storage system comprising: a plurality of memory devices for storing data; a plurality of control modules which accesses the 5 memory devices according to access instructions from a mainframe unit and an open system unit; a plurality first channel adapter which performs interface control to the mainframe unit; and a switch unit connected to the plurality of first channel adapter and the plurality of control modules, and for selectively switching the connection between the plurality of first channel adapter and the plurality of control modules, wherein each said control module comprises: a cache memory which stores a portion of data stored in the memory devices; a second channel adaptor which performs interface control to the open system unit; a disk adapter for performing interface control to the plurality of memory devices; and a control unit which controls the cache memory in response to the accesses, and accesses the memory devices via the disk adapter, and wherein, said first channel adapter, in response to a write access from the mainframe unit, accesses in parallel both one said control module taking charge of the write data to be the target of the write access, and another said control module having mirror data of the control module in charge through said switch unit, so as to perform mirroring.

2. The data storage system according to claim 1,
wherein the control module in charge decides whether a target write data block is existent in the cache memory of the control module,
and when deciding a write miss that the target write data does not exist in the cache memory, both the control module in charge and the another control module access the memory device storing the target data block, and read the target data block.

3. The data storage system according to claim 1,
wherein the first channel adapter connects to the mainframe unit from the start of access to the end of access according to the protocol of the mainframe unit,
and wherein the second channel adapter disconnects the connection to the open system unit on receiving the access from the open system unit, according to the protocol of the open system unit.

4. The data storage system according to claim 1, further comprising:
a plurality of other switch units provided between the plurality of control modules and the plurality of memory devices, and selectively switching between the disk adapter of each control module and the plurality of memory devices,
wherein the plurality of control modules and the plurality of other switch units are connected by a back panel.

5. The data storage system according to claim 4,
wherein the control module connects the control unit to the first channel adapter through a high-speed serial bus of low latency,
and the second channel adapter is connected to the plurality of other switch units through serial buses by the back panel.

6. The data storage system according to claim 5,
wherein each control module and the other switch units are connected by the back panel,
and the other switch units and the plurality of memory devices are connected through cables.

7. The data storage system according to claim 4,
wherein each control module and the switch units are connected by the back panel,
and the switch units and the first channel adapter are connected by the back panel.

8. The data storage system according to claim 1,
wherein the control module connects the control unit to the second channel adapter through a high-speed serial bus of low latency.

9. The data storage system according to claim 1,
wherein the control unit in each control module decides whether the data access from the open system unit through the connected second channel adapter is targeted to the data of which the control unit takes in charge, and when the data access is not targeted to the data of which the control unit takes in charge, the control unit requests the other control unit taking charge of the data to access the data requested from the open system unit, via the switch unit.

10. A data storage control apparatus comprising: a plurality of control modules which accesses a plurality of memory devices for storing data according to access instructions from a mainframe unit and an open system unit; a plurality of first channel adapter which performs interface control to the mainframe unit; and a switch unit connected to the first channel adapter and the plurality of control modules, and for selectively switching the connection between the plurality of first channel adapter and the plurality of control modules, wherein each control module comprises a cache memory which stores a portion of data stored in the memory devices; a second channel adapter which performs interface control to the open system unit; a disk adapter for performing interface control to the plurality of memory devices; and a control unit which controls the cache memory in response to the accesses, and accesses the memory devices via the disk adapter, wherein, said first channel adapter, in response to a write access from the mainframe unit, accesses in parallel both one said control module taking charge of the write data to be the target of the write access, and another said control module having mirror data of the control module in charge through said switch unit, so as to perform mirroring.

11. The data storage control unit according to claim 10,
wherein the control module in charge decides whether a target write data block is existent in the cache memory of the control module,
and when deciding a write miss that does not exist the target write data in the cache memory, both the control module in charge and the another control module access the memory device storing the target data block, so as to read the target data block.

12. The data storage control apparatus according to claim 10,
wherein the first channel adapter connects to the mainframe unit from the start of access to the end of access according to the protocol of the mainframe unit,
and wherein the second channel adapter disconnects the connection to the open system unit on receiving the access from the open system unit, according to the protocol of the open system unit.

13. The data storage control apparatus according to claim 10, further comprising:
a plurality of other switch units provided between the plurality of control modules and the plurality of memory devices, for selectively switching between the disk adapter of each control module and the plurality of memory devices,
wherein the plurality of control modules and the plurality of other switch units are connected by a back panel.

14. The data storage control apparatus according to claim 13,
wherein the control module connects the control unit to the second channel adapter through a high-speed serial bus of low latency,
and the second channel adapter is connected to the plurality of other switch units through serial buses by the back panel.

15. The data storage control apparatus according to claim 14,
wherein each control module and the other switch units are connected by the back panel,
and the other switch units and the plurality of memory devices are connected through cables.

16. The data storage control apparatus according to claim 13,
wherein each control module and the switch units are connected by the back panel,
and the switch units and the first channel adaptor are connected by the back panel.

17. The data storage control apparatus according to claim 10,
wherein the control module connects the control unit to the second channel adapter through a high-speed serial bus of low latency.

18. The data storage control apparatus according to claim 10,
wherein the control unit in each control module decides whether the data access from the open system unit through the connected second channel adapter is targeted to the data of which the control unit takes in charge, and when the data access is not targeted to the data of which the control unit takes in charge, the control unit requests the other control unit taking charge of the data to access the data requested from the open system unit, via the switch unit.

* * * * *

UNITED STATES PATENT AND TRADEMARK OFFICE
CERTIFICATE OF CORRECTION

PATENT NO. : 7,418,533 B2  Page 1 of 1
APPLICATION NO. : 11/378379
DATED : August 26, 2008
INVENTOR(S) : Shigeyoshi Ohara et al.

It is certified that error appears in the above-identified patent and that said Letters Patent is hereby corrected as shown below:

Column 18, Line 15, after "the" delete "5".

Column 18, Line 17, after "plurality" insert --of--.

Column 18, Line 24, change "adaptor" to --adapter--.

Column 19, Line 30, after "the" insert --plurality of the--.

Column 19, Line 32, after "of" insert --the--.

Column 19, Line 34, after "comprises" insert --:--.

Column 19, Line 41, before "in" delete "said first channel adapter,".

Column 19, Line 42, after "unit," insert --the first channel adapter--.

Signed and Sealed this

Tenth Day of February, 2009

JOHN DOLL
*Acting Director of the United States Patent and Trademark Office*